United States Patent
Ishii

(10) Patent No.: US 7,583,329 B2
(45) Date of Patent: Sep. 1, 2009

(54) ELECTRO-OPTICAL DEVICE SUBSTRATE, ELECTRO-OPTICAL DEVICE AND ELECTRONIC APPARATUS

(75) Inventor: Tatsuya Ishii, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 97 days.

(21) Appl. No.: 12/018,935

(22) Filed: Jan. 24, 2008

(65) Prior Publication Data

US 2008/0186423 A1    Aug. 7, 2008

(30) Foreign Application Priority Data

Feb. 1, 2007    (JP) .............................. 2007-022660

(51) Int. Cl.
*G02F 1/136*    (2006.01)
(52) U.S. Cl. .............................. 349/46; 349/19; 349/33; 349/41; 349/42; 349/43; 385/1; 385/2; 385/4; 385/8
(58) Field of Classification Search .................. 349/19, 349/33, 41, 42, 43, 46; 385/1, 2, 4, 8
See application file for complete search history.

(56) References Cited

U.S. PATENT DOCUMENTS

| | | | | |
|---|---|---|---|---|
| 7,362,304 B2* | 4/2008 | Takatori et al. | ............. | 345/103 |
| 2009/0080154 A1* | 3/2009 | Hirabayashi et al. | ........ | 361/690 |

FOREIGN PATENT DOCUMENTS

| | | |
|---|---|---|
| JP | 2003-262888 | 9/2003 |
| JP | 2004-004722 | 1/2004 |
| JP | 3731447 | 10/2005 |

* cited by examiner

*Primary Examiner*—Jennifer Doan
(74) *Attorney, Agent, or Firm*—Workman Nydegger

(57) ABSTRACT

An electro-optical device substrate includes a substrate, a plurality of data lines, a plurality of scanning lines, pixel electrodes, and transistors. The plurality of data lines and the plurality of scanning lines intersect with each other in a display area formed on the substrate. The pixel electrodes are provided at positions corresponding to intersections of the plurality of data lines and the plurality of scanning lines. Each of the transistors includes a semiconductor layer and a gate electrode. The semiconductor layer has a channel region, a data line side source/drain region, a pixel electrode side source/drain region, a first junction region, and a second junction region. The channel region has a channel length along a first direction in the display area. The data line side source/drain region is electrically connected to a corresponding data line. The pixel electrode side source/drain region is electrically connected to a corresponding pixel electrode.

14 Claims, 16 Drawing Sheets

ELECTRO-OPTICAL DEVICE SUBSTRATE, ELECTRO-OPTICAL DEVICE AND ELECTRONIC APPARATUS

BACKGROUND

1. Technical Field

The present invention relates to a technical field of, for example, an electro-optical device substrate used for an electro-optical device such as a liquid crystal device, an electro-optical device provided with the electro-optical device substrate, and an electronic apparatus, such as a liquid crystal projector, for example, provided with the electro-optical device.

2. Related Art

A liquid crystal device, which is an example of the above electro-optical device, is not only used for a direct view type display but also used widely, for example, as a light modulating device (light valve) of a projection-type display device. Particularly, when in a projection-type display device, because intensive light emitted from a light source enters a liquid light valve, a light shielding film, which serves as a light shielding device that blocks incident light, is installed in the liquid light valve so that a thin-film transistor (TFT) in the liquid light valve does not cause an increase in leakage current and/or a malfunction, or the like, because of the intensive light. In regard to the above light shielding device or the light shielding film, Japanese Unexamined Patent Application Publication No. 2004-4722 describes a technology for blocking light using a scanning line, which serves as a gate electrode, in a channel region of a TFT. Japanese Patent No. 3731447 describes that light that reaches a channel region of a TFT is reduced by providing a plurality of light shielding films formed on the channel region and a layer that absorbs internally reflected light. Japanese Unexamined Patent Application Publication No. 2003-262888 describes a technology for reducing incident light that enters a channel region of a TFT as much as possible while making it possible to ensure an appropriate operation of the TFT and to reduce the width of a scanning line.

However, even when light that enters a TFT is blocked by the above described light shielding film, the light shielding film is, as viewed three-dimensionally, spaced apart from a semiconductor layer that constitutes the TFT through, for example, an insulating film, and the like. Thus, there is a possibility that incident light that obliquely enters from the side of the light shielding film may reach the semiconductor layer that constitutes the TFT and, hence, light leakage current may occur in the TFT. Because of the above light leakage current in the TFT, there has been a technical problem in which display defects, such as flicker or pixel chrominance non-uniformity, may occur and, as a result, the display image quality decreases.

SUMMARY

An advantage of some aspects of the invention is that, for example, in an electro-optical device, such as an active matrix addressing liquid crystal device, it provides an electro-optical device substrate used for an electro-optical device that is able to display a high-quality image while making it possible to reduce the occurrence of light leakage current in a pixel switching TFT, an electro-optical device that is provided with the electro-optical device substrate, and an electronic apparatus that is provided with the electro-optical device.

A first aspect of the invention provides an electro-optical device substrate. The electro-optical device substrate includes a substrate, a plurality of data lines, a plurality of scanning lines, pixel electrodes, and transistors. The plurality of data lines and the plurality of scanning lines intersect with each other in a display area formed on the substrate. The pixel electrodes are provided at positions corresponding to intersections of the plurality of data lines and the plurality of scanning lines. Each of the transistors includes a semiconductor layer and a gate electrode. The semiconductor layer has a channel region, a data line side source/drain region, a pixel electrode side source/drain region, a first junction region, and a second junction region. The channel region has a channel length along a first direction in the display area. The data line side source/drain region is electrically connected to a corresponding one of the data lines. The pixel electrode side source/drain region is electrically connected to a corresponding one of the pixel electrodes. The first junction region is formed between the channel region and the data line side source/drain region. The second junction region is formed between the channel region and the pixel electrode side source/drain region. The gate electrode includes a body portion, a first elongated portion, and a second elongated portion. The body portion is arranged in an upper layer than the semiconductor layer through a first insulating film and overlaps the channel region on the substrate as viewed in plan. The first elongated portion extends from the body portion by a side of the semiconductor layer along the first direction to a side of the second junction region so as to adjoin at least the second junction region. The second elongated portion extends from at least a portion of the first elongated portion along a second direction that intersects with the first direction, and is electrically connected to a corresponding one of the scanning lines. A longitudinal groove is formed in the first insulating film at a portion that overlaps the first elongated portion on the substrate as viewed in plan so as to extend along the second junction region. The first elongated portion has an inner groove portion that is at least partly formed inside the groove.

According to an electro-optical device that is provided with the electro-optical device substrate of the aspect of the invention, while the electro-optical device is operating, for example, in the electro-optical device substrate, supply of image signals from the data lines to the pixel electrodes are controlled, so that an image may be displayed by means of so-called active matrix addressing. Note that an image signal is supplied to the pixel electrode from a corresponding one of the data lines through the transistor at predetermined timing in such a manner that the transistor, which is a switching element electrically connected between the data line and the pixel electrode, is turned on/off in accordance with a scanning signal supplied from a corresponding one of the scanning lines. The pixel electrode is a transparent electrode that is, for example, formed of a transparent conductive material, such as ITO (Indium Tin Oxide). The plurality of pixel electrodes are provided in a matrix in an area, which becomes a display area, on the substrate at positions corresponding to intersections of the data lines and the scanning lines.

Each of the transistors includes the semiconductor layer and the gate electrode. The semiconductor layer has the channel region, the data line side source/drain region and the pixel electrode side source/drain region. The gate electrode overlaps the channel region.

The channel region has a channel length along the first direction in the display area. The "first direction" according to the aspect of the invention means, for example, a direction of rows of a plurality of pixels defined in a matrix on the substrate, that is, an array direction in which the plurality of data lines are arranged or a direction in which the plurality of scanning lines extend (for example, in an X direction indicated in the drawings, which will be described later), or a direction of columns of the plurality of pixels defined in a matrix on the substrate, that is, an array direction in which the plurality of scanning lines are arranged or a direction in which the plurality of data lines extend (for example, in a Y direction indicated in the drawings, which will be described later).

The data line side source/drain region is electrically connected to a corresponding one of the data lines, and the pixel electrode side source/drain region is electrically connected to a corresponding one of the pixel electrodes. Furthermore, the first junction region is formed in the semiconductor layer between the channel region and the data line side source/drain region. The second junction region is formed in the semiconductor layer between the channel region and the pixel electrode side source/drain region. The first junction region is a region that is formed at a junction between the channel region and the data line side source/drain region. The second junction region is a region that is formed at a junction between the channel region and the pixel electrode side source/drain region. That is, the first junction region and the second junction region mean, for example, a PN junction region when a transistor is, for example, formed as an NPN type or a PNP type transistor (that is, an N channel type or a P channel type transistor) or an LDD region (that is, an impurity region formed by implanting smaller impurities into the semiconductor layer than those included in each of the source/drain regions, by means of ion implantation, for example) when the transistor has an LDD (Lightly Doped Drain) structure.

The gate electrodes are arranged in an upper layer than the corresponding semiconductor layers through the first insulating film. The first insulating film functions as a gate insulating film that electrically insulates the gate electrodes from the corresponding channel regions. The first insulating film is typically laminated over the entire substrate so as to cover the semiconductor layers.

In the aspect of the invention, each of the gate electrodes is formed to include the body portion, the first elongated portion and the second elongated portion. The body portion of the gate electrode is, for example, supplied with a scanning signal through the second elongated portion that is formed with the same film as that of the scanning line, and the transistor enters an on state when a gate voltage corresponding to the scanning signal is applied. That is, the body portion is a portion that substantially functions as the gate electrode of the transistor.

In the aspect of the invention, particularly, the first elongated portion extends from the body portion along the first direction by the side of the semiconductor layer. The first elongated portion is provided in a region along the first direction by the side of the semiconductor layer within a non-aperture region of each pixel. Note that the non-aperture region is a region arranged around an aperture region so as to define the aperture region, which is a region within the pixel, in which light that actually contributes display is transmitted or reflected. That is, within the pixel, the non-aperture region is formed as a region in which no light is transmitted or reflected. Light shielding films, light shielding devices, scanning lines, data lines, and the like, are arranged in the non-aperture region, and the non-aperture region is defined by these various components. Furthermore, the first elongated portion extends so as to adjoin at least the second junction region on the substrate as viewed in plan. That is, the first elongated portion extends along the first direction on both sides or on one side along the second junction region in the semiconductor layer that is formed to extend along the first direction. Thus, the first elongated portion is able to, in the immediately upper layer of the semiconductor layer through the first insulating film that functions as a gate insulating film, block light that will enter the second junction region of the semiconductor layer, which adjoins the first elongated portion, from the upper layer of thereof. Thus, in comparison with the case where light is blocked by a light shielding film or a light shielding device that is arranged in an upper layer further above the gate electrode, it is possible to further reliably block light that will enter at least the second junction region of the semiconductor layer. That is, the "further reliably block light" is intended to mean that, owing to a portion of the first elongated portion, which adjoins the second junction region, in comparison with a light shielding film or a light shielding device that is arranged in the further upper layer than the gate electrode, it is possible to further reduce light that will enter the semiconductor layer by penetrating into the lower layer thereof.

Moreover, in the aspect of the invention, particularly, a longitudinal groove is formed in the first insulating film at a portion that overlaps the first elongated portion on the substrate as viewed in plan so as to extend along the second junction region, and the inner groove portion of the first elongated portion is at least partly formed on a wall portion and a bottom portion inside the groove. Thus, the inner groove portion is, as viewed three-dimensionally, formed as a wall-shaped light shielding body extending along the second junction region of the semiconductor layer. Accordingly, it is possible to block, by the inner groove portion, not only light that will enter the second junction region of the semiconductor layer from the upper layer thereof but also light that will enter through the same layer and return light that will enter from the lower layer thereof through the substrate. Thus, because light that will enter the semiconductor layer may be blocked not only by a portion of the first elongated portion, which is formed in a planar manner (that is, a portion formed along the substrate plane) but also by the inner groove portion, it is possible to enhance a light shielding property to the semiconductor layer.

In addition, in the aspect of the invention, particularly, the second elongated portion extends from at least a portion of the first elongated portion along the second direction that intersects with the first direction. That is, the second elongated portion is provided continuously to a portion of the first elongated portion or to the substantially entire first elongated portion. For example, the second elongated portion extends from a portion of the first elongated portion, located closer to the pixel electrode side source/drain region than the body portion, along the second direction. Alternatively, for example, the second elongated portion extends from a portion of the first elongated portion, which adjoins the second junction region, along the second direction. Alternatively, for example, the second elongated portion extends from a portion of the first elongated portion, located at the end adjacent to the pixel electrode side source/drain region, along the second direction. In this manner, at least a portion of the first elongated portion may be apparently increased in an area of arrangement on the substrate by an amount of the second elongated portion. Thus, among rays of light that travel toward at least the second junction region of the semiconductor layer, light that will enter at least a portion of the first elongated portion extending so as to adjoin the second junction region may be blocked with a wider area by providing the second elongated portion. Thus, owing to the second elongated portion, it is possible to enhance a light shielding property to the second junction region of the semiconductor layer.

As described above, according to the electro-optical device substrate of the aspect of the invention, a light shielding property against light that will enter at least the second junction region of the semiconductor layer may be further improved by the first elongated portion and the second elongated portion. Here, as will be described later, according to the research by the inventors of the present application, theoretically, between the first junction region and the second junction region, light leakage current relatively tends to occur particularly in the second junction region while the transistor is operating, and it has been proved by experiment. In the aspect of the invention, it is possible to improve a light shielding property to the second junction region in which light leakage current particularly tends to occur in the semiconductor layer and, as a result, it is possible to further effectively reduce light leakage current in the semiconductor layer of the transistor.

Thus, according to the electro-optical device that uses the electro-optical device substrate of the aspect of the invention, while the electro-optical device is operating, it is possible to prevent the occurrence of display defects or to reduce a degree of display defect to such a degree that, on the display, it is not recognized as a substantial display defect, because of an occurrence of light leakage current of the transistor of each pixel. Hence, it is possible to display a high-quality image in the electro-optical device.

In one aspect of the electro-optical device substrate according to the invention, the first elongated portion and the second elongated portion each may be provided on both sides of the semiconductor layer.

According to this aspect, the first elongated portions are provided so as to adjoin both sides of the second junction region of the semiconductor layer, and the second elongated portions extend from the respective first elongated portions provided on both sides of the second junction region. Thus, a light shielding property against light that will enter the second junction region may be further improved. Accordingly, it is possible to further effectively reduce light leakage current in the semiconductor layer of the transistor.

In another aspect of the electro-optical device substrate according to the invention, the second elongated portion may extend from at least a portion of the first elongated portion, which adjoins the second junction region.

According to this aspect, a portion of the first elongated portion, which adjoins at least the second junction region, may be apparently increased in an area of arrangement on the substrate by an amount of the second elongated portion. Thus, light that travels toward the second junction region of the semiconductor layer, extending in a direction along the first direction, may be blocked with a wider area by an amount of the second elongated portion. Thus, a light shielding property to the second junction region of the semiconductor layer may be further effectively improved by enhancing the a light shielding property using the second elongated portion in addition to the first elongated portion.

In further another aspect of the electro-optical device substrate according to the invention, the first elongated portion may be provided so as to at least partly adjoin the pixel electrode side source/drain region.

According to this aspect, the first elongated portion extends along the first direction so as to at least partly adjoin the pixel electrode side source/drain region in addition to the second junction region of the semiconductor layer. Thus, owing to the first elongated portion, it is possible to block light that will enter at least a portion of the pixel electrode side source/drain region, in addition to the second junction region, from the upper layer thereof. In addition, light that will enter the second junction region may also be blocked by the first elongated portion with a wider area by the side of the semiconductor layer.

Thus, according to this aspect, it is possible to improve a light shielding property to the semiconductor layer.

In the above described aspect in which the first elongated portion is provided so as to also adjoin the pixel electrode side source/drain region, the second elongated portion may be configured to extend from a portion of the first elongated portion, which adjoins at least the pixel electrode side source/drain region.

In this case, a portion of the first elongated portion, which adjoins at least the pixel electrode side source/drain region, may be apparently increased in an area of arrangement on the substrate by an amount of the second elongated portion. Thus, light that travels toward the second junction region that is in contact with the pixel electrode side source/drain region, extending in a direction along the first direction, may be blocked with a wider area by an amount of the second elongated portion. Thus, a light shielding property to the second junction region of the semiconductor layer may be further effectively improved by enhancing a light shielding property using the second elongated portion in addition to the first elongated portion.

In the above described aspect in which the first elongated portion is provided so as to adjoin the pixel electrode side source/drain region, the groove may also be formed along at least a portion of the pixel electrode side source/drain region.

In this case, in the first insulating film, the groove is formed along the pixel electrode side source/drain region in addition to the second junction region, and, in the first elongated portion, the inner groove portion may be formed as a wall-shaped light shielding body that extends along from the second junction region of the semiconductor layer to the pixel electrode side source/drain region. Thus, it is possible to also block light that travels toward the pixel electrode side source/drain region of the semiconductor layer by the inner groove portion. In addition, it is possible to also block light that travels toward the second junction region of the semiconductor layer by the inner groove portion with a wider area by the side of the semiconductor layer. Thus, according to this aspect, it is possible to improve a light shielding property to the semiconductor layer.

In yet another aspect of the electro-optical device substrate according to the invention, the first elongated portion may be provided so as to at least partly adjoin the channel region.

According to this aspect, the first elongated portion is formed so as to at least partly adjoin the channel region of the semiconductor layer, it is possible to block light that will enter the channel region. Thus, a light shielding property to the channel region of the semiconductor layer may also be improved, so that it is possible to further reduce light leakage current. Moreover, light that will enter the second junction region may be blocked by a portion of the first elongated portion, which also adjoins the channel region, so that it is possible to further improve a light shielding property to the second junction region.

In view of the above light shielding property, the first elongated portion is preferably formed so as to adjoin the substantially entire channel region. On the other hand, in view of improvement of aperture ratio of the pixels, the first elongated portion is preferably formed so as to partly adjoin the channel region. That is, in the latter case, as a shape for ensuring the configuration in which the first elongated portion adjoins the second junction region, a portion of the first elongated portion, which adjoins the channel region, is preferably provided with a necessary minimum area of arrangement. Note that the "aperture ratio" means a ratio of an aperture region to the size of a pixel that includes the aperture region and a non-aperture region. As the aperture ratio increases, display performance of the device improves.

In the above described aspect in which the first elongated portion is provided so as to adjoin the channel region as well, the groove may be formed along at least a portion of the channel region.

In this case, it is possible to block light that will enter the channel region by the inner groove portion of the first elongated portion. That is, in the first insulating film, the groove is formed along at least a portion of the channel region in addition to the second junction region, the inner groove portion of the first elongated portion may be formed as a wall-shaped light shielding body along from the second junction region to at least a portion of the channel region in the semiconductor layer. Thus, it is possible to block not only light that travels toward the channel region of the semiconductor layer but also light that travels toward the second junction region of the semiconductor layer by the inner groove portion with a wider area.

In further yet another aspect of the electro-optical device substrate according to the invention, the scanning lines and the gate electrodes may be formed with the same film each other.

According to this aspect, in a manufacturing process of the electro-optical device substrate, the gate electrodes and the scanning lines may be formed in the same process with the same film at the same time, so that it is possible to simplify the manufacturing process.

In another aspect of the electro-optical device substrate according to the invention, the first junction region and the second junction region both may be LDD regions.

According to this aspect, the transistor has an LDD structure. Thus, while the transistor is not operating, it is possible to reduce an off current that flows through the data line side source/drain region and the pixel electrode side source/drain region, and to reduce electric field relaxation at the drain end when the transistor operates in a saturation region, so that it is possible to suppress a decrease in on current due to an increase in threshold value based on a hot-carrier phenomenon (a problem on reliability related to degradation of transistor characteristics).

In yet another aspect of the electro-optical device substrate according to the invention, a second insulating film may be provided so as to be arranged in a lower layer than the semiconductor layer on the substrate, wherein the groove may extend through the first insulating film so as to be also formed in the second insulating film.

According to this aspect, the depth of the groove is greater than an interlayer distance from the upper surface of the first insulating film to the upper surface of the semiconductor layer. The inner groove portion of the first elongated portion, for example, extends from the upper surface of the first insulating film through the first insulating film and is formed along a wall portion and bottom portion of the groove that is formed in the second insulating film arranged in a lower layer than the semiconductor layer. Thus, it is possible to further enhance a light shielding property to block light that will enter the semiconductor layer.

In the above described aspect in which the second insulating film is provided, a lower side light shielding film containing a light shielding material may be arranged in a lower layer than the second insulating film on the substrate and at least partly overlap the semiconductor layer, wherein the groove may be formed to also extend through the second insulating film to the surface of the lower side light shielding film, wherein the inner groove portion and the lower side light shielding film may be electrically connected to each other in the groove.

As the thus configured, it is possible to shield the transistor by the lower side light shielding film against return light that enters the device from the substrate side, such as light reflected on the rear face of the substrate, light that is emitted, in a double-plate projector, from another liquid crystal device and that penetrates through a composite optical system. Thus, it is possible to further reliably reduce the occurrence of light leakage current in the transistor.

In addition, the lower side light shielding film is preferably formed to overlap at least the channel region of the semiconductor layer as viewed in plan, and the inner groove portion of the first elongated portion is electrically connected to the lower side light shielding film in such a manner that the inner groove portion of the first elongated portion is in contact with the surface of the lower side light shielding film, which is exposed from the first insulating film by the groove formed to extend through the first insulating film and the second insulating film (in other words, the groove functions as a contact hole for connecting the first elongated portion and the lower side light shielding film). Thus, a portion of the lower side light shielding film, which overlaps the channel region, may be used to function as the gate electrode of the transistor. That is, the transistor has a double-gate or a dual gate structure. Accordingly, channels may be formed on both the upper face side and lower face side of the channel region of the semiconductor layer. As a result, in comparison with the case where a channel is formed only on the upper face side of the channel region of the semiconductor layer, it is possible to increase a current, that is, an on current, flowing through the channel region while the transistor is operating.

An aspect of the invention provides an electro-optical device that is provided with the above described electro-optical device substrate according to the invention (including various aspects thereof).

According to the electro-optical device of the aspect of the invention, because it is provided with the above described electro-optical device substrate according to the invention, it is possible to provide the electro-optical device that is able to display a high-quality image while reducing a flicker and/or pixel chrominance non-uniformity.

An aspect of the invention provides an electronic apparatus that includes the above described electro-optical device according to the invention.

According to the electronic apparatus of the aspect of the invention, because it is provided with the above described electro-optical device according to the invention, it is possible to realize various electronic apparatuses that are able to perform high-quality display, such as a projection display device, a cellular phone, a personal organizer, a word processor, a viewfinder type or a direct view type video tape recorder, a workstation, a video telephone, a point-of-sales terminal, or a touch panel. In addition, as the electronic apparatus according to the aspect of the invention, it is possible to, for example, realize an electrophoretic device, or the like, such as an electronic paper.

The functions and other advantageous effects of the aspects of invention become apparent from the exemplary embodiments described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments according to the invention will be described with reference to the accompanying drawings. In the following embodiments, a TFT active matrix addressing liquid crystal device, which has an installed driving circuit, is used as one example of an electro-optical device according to the aspects of the invention.

First Embodiment

A liquid crystal device according to a first embodiment of the invention will be described with reference to FIG. 1 to FIG. 18.

First, the general configuration of the liquid crystal device according to the present embodiment will be described with reference to FIG. 1 and FIG. 2.

Figure 1:
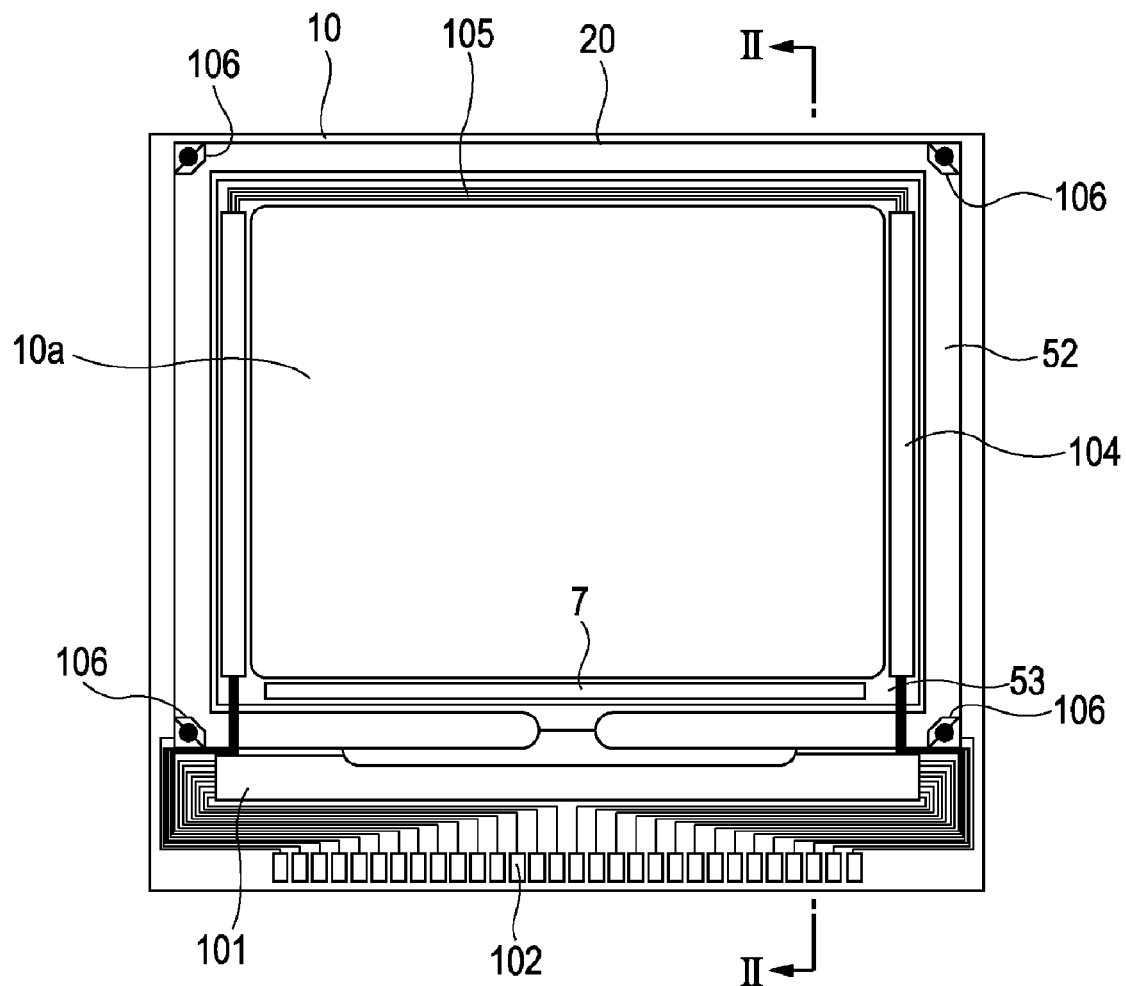
FIG. 1 is a schematic plan view of a liquid crystal device.

FIG. 1 is a schematic plan view of the liquid crystal device, showing a TFT array substrate together with various components formed thereon, as viewed from the side of an opposite substrate. FIG. 2 is a cross-sectional view that is taken along the line II-II in FIG. 1.

Figure 2:
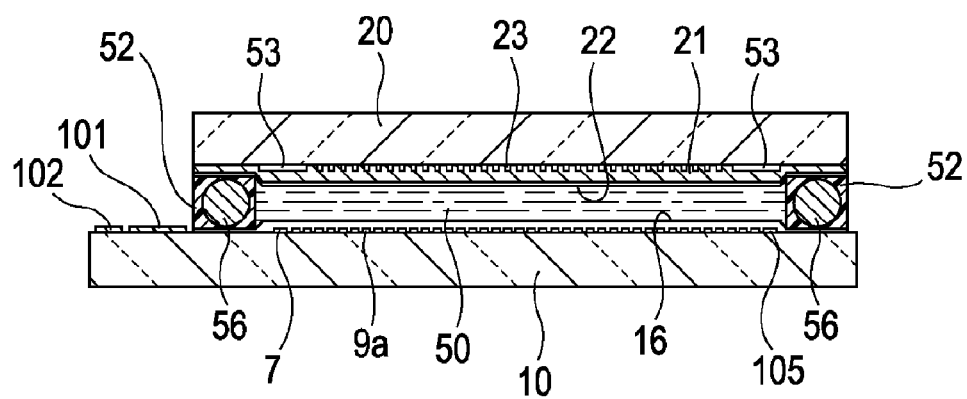
FIG. 2 is a cross-sectional view that is taken along the line II-II in FIG. 1.

In FIG. 1 and FIG. 2, the liquid crystal device is formed of a TFT array substrate 10 and an opposite substrate 20, which are opposed to each other. The TFT array substrate 10 is a transparent substrate, such as a quartz substrate, a glass substrate, or a silicon substrate, for example. The opposite substrate 20 is also a transparent substrate that is, for example, formed of the same material as that of the TFT array substrate 10. A liquid crystal layer 50 is sealed between the TFT array substrate 10 and the opposite substrate 20. The TFT array substrate 10 and the opposite substrate 20 are adhered to each other by a seal material 52, which is provided in a seal region located around an image display area 10a, which is one example of a "display area" according to the aspects of the invention.

The seal material 52 is, for example, formed of an ultraviolet curing resin, a thermoset resin, or the like, for adhering both substrates. The seal material 52, after being applied on the TFT array substrate 10 in a manufacturing process, is hardened by ultraviolet irradiation, heating, or the like. In addition, for example, in the seal material 52, gap materials 56, such as glass fibers or glass beads, are dispersed in order to form a gap (inter-substrate gap), having a predetermined value, between the TFT array substrate 10 and the opposite substrate 20. The liquid crystal device according to the present embodiment is suitable for performing enlarged display with a small size used for a light valve of a projector.

In parallel to the inside of the seal region in which the seal material 52 is arranged, a window-frame-shaped light shielding film 53, having a light shielding property, that defines a window frame region of the image display area 10a is provided on the side of the opposite substrate 20. However, part or all of the window-frame-shaped light shielding film 53 may be provided on the side of the TFT array substrate 10 as an internal light shielding film.

In a peripheral region located around the image display area 10a on the TFT array substrate 10, a data line driving circuit 101, a sampling circuit 7, scanning line driving circuits 104, and an external circuit connection terminal 102 are formed.

In the peripheral region on the TFT array substrate 10 and on the outer side of the seal region, the data line driving circuit 101 and the external circuit connection terminal 102 are provided along one side of the TFT array substrate 10. In addition, in a region located inside the seal region within the peripheral region on the TFT array substrate 10, the sampling circuit 7 is arranged along one side of the image display area 10a and along one side of the TFT array substrate 10 so as to be covered with the window-frame-shaped light shielding film 53.

In addition, the scanning line driving circuits 104 are provided along two sides, adjacent to one side, of the TFT array substrate 10 so as to be covered with the window-frame-shaped light shielding film 53. Moreover, in order to electrically connect the two scanning line driving circuits 104 provided on both sides of the image display area 10a, a plurality of wirings 105 are provided along the remaining one side of the TFT array substrate 10 so as to be covered with the window-frame-shaped light shielding film 53.

Furthermore, in the peripheral region on the TFT array substrate 10, conductive terminals 106 are arranged at regions that are opposed to four corner portions of the opposite substrate 20, and conductive materials are provided between the TFT array substrate 10 and the opposite substrate 20 at positions corresponding to the conductive terminals 106 and electrically connected to the terminals 106.

In FIG. 2, a laminated structure in which pixel switching TFTs, which serve as driving elements, and wirings, such as scanning lines, data lines, and the like, are formed on the TFT array substrate 10. In the image display area 10a, pixel electrodes 9a are provided in a matrix in the upper layer of the pixel switching TFTs and the wirings, such as the scanning lines and the data lines. An alignment layer 16 is formed on the pixel electrodes 9a. Note that, in the present embodiment, each of the pixel switching elements may be various types of transistors, a TFD (Thin Film Diode), or the like, other than the TFT.

On the other hand, a light shielding film 23 is formed on a face of the opposite substrate 20, opposite the TFT array substrate 10. The light shielding film 23 is, for example, formed of a light shielding metal film, or the like, and is patterned, for example, in a grid, or the like, in the image display area 10a on the opposite substrate 20. Then, an opposite electrode 21, which is formed of a transparent material, such as ITO, is formed, for example, in a solid manner on the light shielding film 23 (on the lower side of the light shielding film 23 in FIG. 2) so as to be opposed to the plurality of pixel electrodes 9a. Further, an alignment layer 22 is formed on the opposite electrode 21 (on the lower side of the opposite electrode 21 in FIG. 2).

The liquid crystal layer 50 is, for example, formed of liquid crystal that is mixed with a single or multiple types of nematic liquid crystal. The liquid crystal layer 50 is made into a predetermined aligned state between a pair of these alignment layers. Then, when the liquid crystal device is being driven, liquid crystal holding capacitors are formed between the pixel electrodes 9a and the opposite electrode 21 by being applied with voltage, respectively.

Although not described in the drawing, in addition to the data line driving circuit 101 and the scanning line driving circuits 104, a pre-charge circuit that separately supplies pre-charge signals of predetermined voltage levels to the plurality of data lines in advance of image signals, a check circuit for checking quality, defects, or the like, of the liquid crystal device during manufacturing or upon shipment, or the like, may be formed on the TFT array substrate 10.

The electrical configuration of pixel portions of the liquid crystal device according to the present embodiment will be described with reference to FIG. 3.

Figure 3:
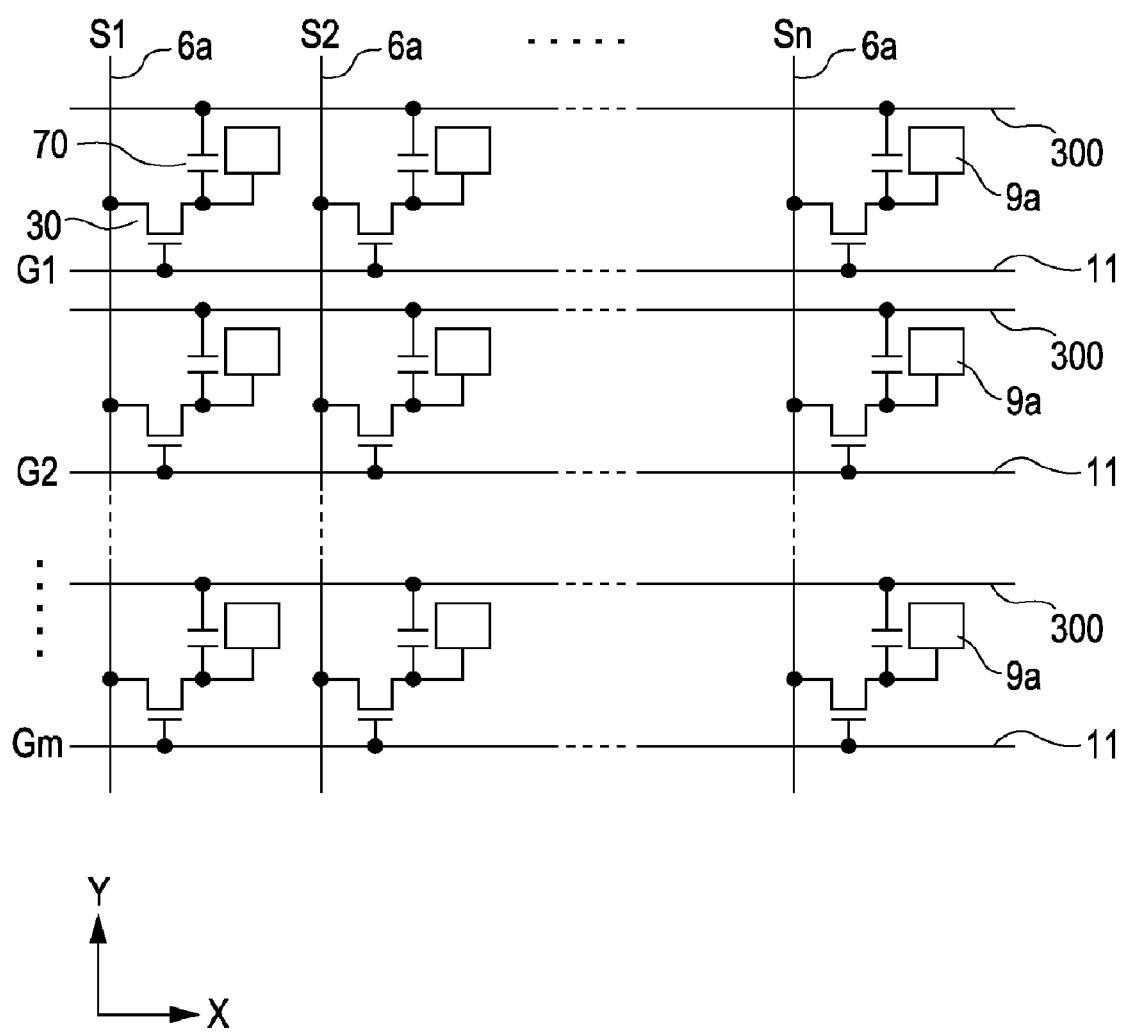
FIG. 3 is an equivalent circuit diagram of various elements, wirings, and the like, in a plurality of pixels that are formed in a matrix and that constitute an image display area of the liquid crystal device according to an embodiment.

FIG. 3 is an equivalent circuit diagram of various elements, wirings, and the like, in a plurality of pixels that are formed in a matrix and that constitute an image display area of the liquid crystal device according to the present embodiment.

In FIG. 3, the pixel electrodes 9a and TFTs 30, which serve as one example of a "transistor" according to the aspects of the invention, are formed in each of a plurality of pixels, which are formed in a matrix and constitute the image display area 10a. Each of the TFTs 30 is electrically connected to a corresponding one of the pixel electrodes 9a, and controls switching of the pixel electrode 9a while the liquid crystal device is operating. Each of the data lines 6a, which are supplied with image signals, is electrically connected to the source of the corresponding TFT 30. The image signals S1, S2, . . . , Sn to be written to the data lines 6a may be supplied in line sequential in this order or may be supplied to the plurality of adjacent data lines 6a in units of group.

Each of the scanning lines 11 is electrically connected to the gate of the corresponding TFT 30. The liquid crystal device according to the present embodiment is configured to apply scanning signals G1, G2, . . . , Gm in line sequential in this order at predetermined timing to the scanning lines 11 in the form of pulse. Each of the pixel electrodes 9a is electrically connected to the drain of the corresponding TFT 30. By turning off the TFT 30, which serves as a switching element, only during a certain period, the image signals S1, S2, . . . , Sn supplied from the data lines 6a are written to the corresponding pixel electrodes 9a at predetermined timing. The image signals S1, S2, . . . , Sn of predetermined levels, written through the pixel electrodes 9a to liquid crystal, which is one example of an electro-optical material, are held between the pixel electrodes 9a and the opposite electrode 21, which is formed on the opposite substrate 20, during a certain period of time.

Liquid crystal that constitutes the liquid crystal layer 50 (see FIG. 2) modulates light to enable gray shade as alignment and/or order of molecular association is varied by an applied voltage level. In the case of a normally white mode, a transmittance ratio to incident light is reduced in accordance with a voltage applied in units of pixel. In the case of a normally black mode, a transmittance ratio to incident light is increased in accordance with a voltage applied in units of pixel. As a whole, light having a contrast corresponding to image signals is emitted from the liquid crystal device.

Here, in order to prevent the leakage of image signals being held, storage capacitors 70 are added so as to be electrically in parallel with the liquid crystal capacitors that are formed between the corresponding pixel electrodes 9a and the opposite electrode 21 (see FIG. 2). Each of the storage capacitors 70 is a capacitive element that functions as a holding capacitor that temporarily holds an electric potential of the corresponding pixel electrode 9a in accordance with supply of an image signal. One of electrodes of the storage capacitor 70 is electrically in parallel with the pixel electrode 9a and is connected to the drain of the TFT 30, and the other electrode is connected to a capacitor line 300 having a fixed electric potential so as to be applied with a constant electric potential. Owing to the storage capacitor 70, electric potential holding characteristic is improved in the pixel electrode 9a, and it is possible to improve contrast and to improve display characteristics, such as a reduction in flicker. Note that the storage capacitor 70, as will be described later, also functions as an internal light shielding film that blocks light entering the TFT 30.

Next, the specific configuration of the pixel portions that implement the above operation will be described with reference to FIG. 4 to FIG. 6.

Figure 4:
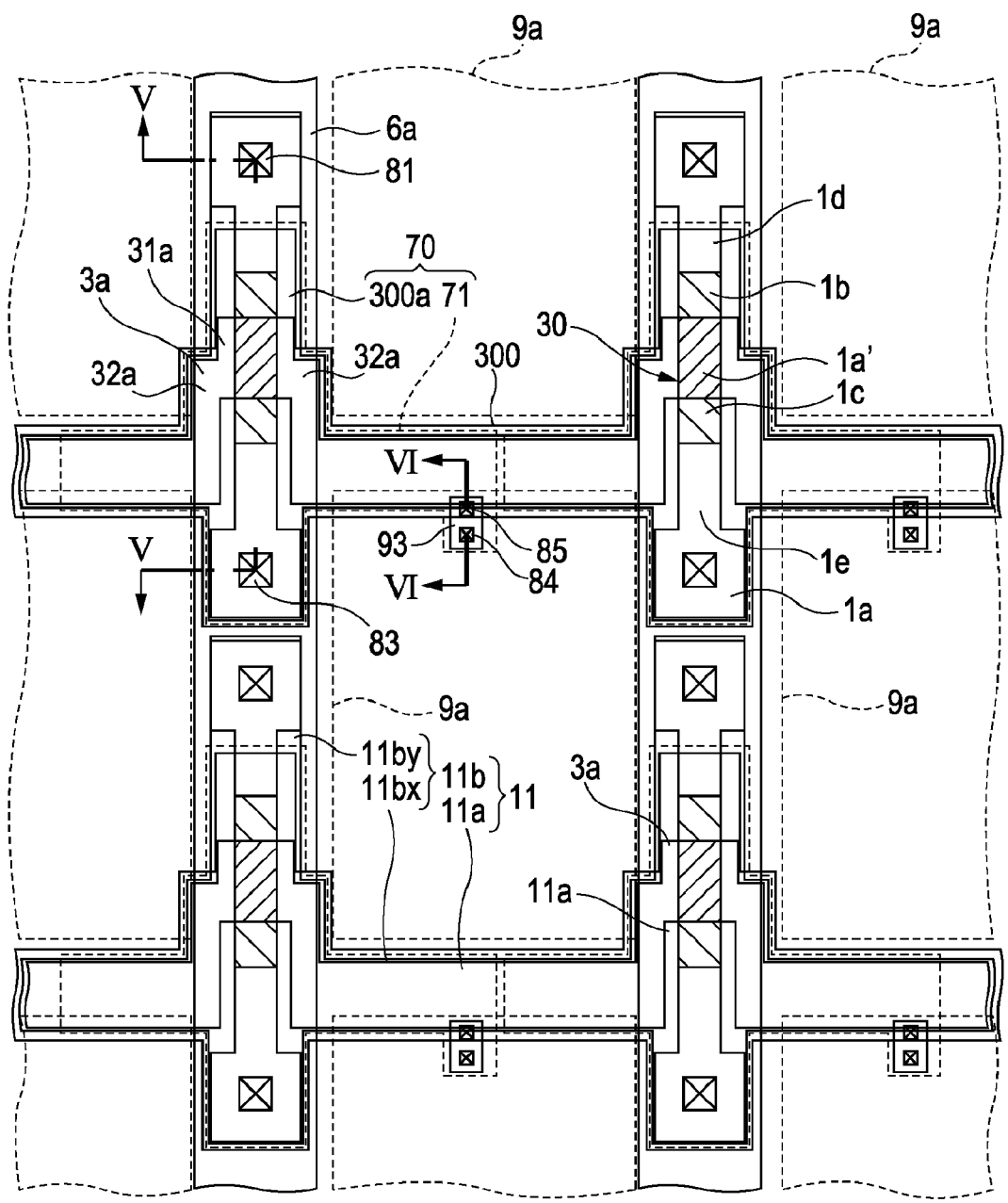
FIG. 4 is a plan view of a plurality of adjacent pixel portions.

FIG. 4 is a plan view of a plurality of adjacent pixel portions. FIG. 5 is a cross-sectional view that is taken along the line V-V in FIG. 4. FIG. 6 is a cross-sectional view that is taken along the line VI-VI in FIG. 4. Note that, in FIG. 4 to FIG. 6, in order to make it easier to recognize the layers and components in the drawings, the dimensions and ratios of the components are appropriately varied. This also applies to the relevant drawings among FIG. 7 to FIG. 20, which will be described later. In FIG. 4 to FIG. 6, only the configuration of the TFT array substrate side will be described among the configurations described with reference to FIG. 1 or in FIG. 2; however, for easier description, portions located on or above the pixel electrodes 9a are not shown in these drawings.

Figure 5:
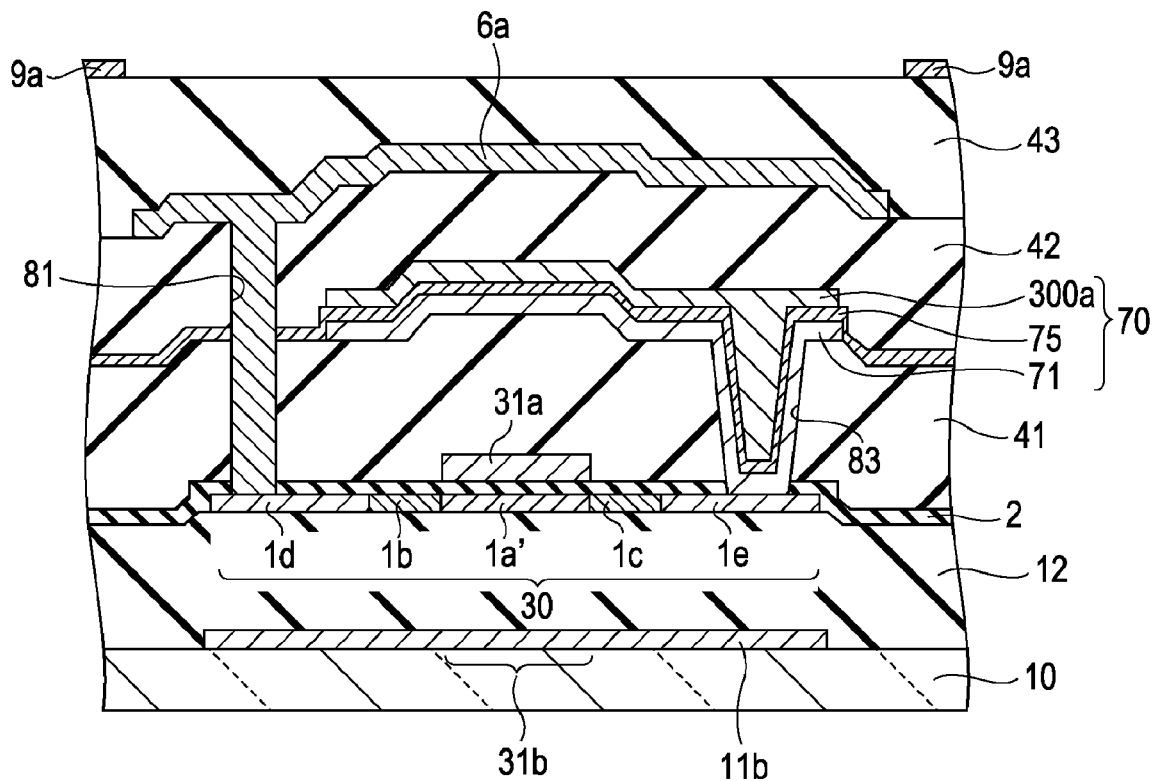
FIG. 5 is a cross-sectional view that is taken along the line V-V in FIG. 4.

Here, in FIG. 5, the portions from the TFT array substrate 10 to the pixel electrodes 9a constitute one example of an "electro-optical device substrate" according to the aspects of the invention.

In FIG. 4, the plurality of pixel electrodes 9a are provided on the TFT array substrate 10 in a matrix. The data lines 6a and the scanning lines 11 (that is, scanning lines 11a and 11b) are provided along vertical and horizontal boundaries between the adjacent pixel electrodes 9a. That is, the scanning lines 11a and 11b extend along the X direction in FIG. 4, and the data lines 6a extend along the Y direction in FIG. 4 so as to intersect with the scanning lines 11a or 11b. The pixel switching TFTs 30 are provided at positions at which the scanning lines 11 and the data lines 6a intersect with each other.

The scanning lines 11, the data lines 6a, the storage capacitors 70, lower side light shielding films 11b that constitute the scanning lines 11, relay layers 93 and the TFTs 30 are arranged in a non-aperture region on the TFT array substrate 10, which surrounds aperture regions of the pixels (that is, regions of the pixels, in which light is transmitted or reflected to contribute to actual display) corresponding to the pixel electrodes 9a, as viewed in plan. That is, these scanning lines 11, storage capacitors 70, data lines 6a, lower side light shielding films 11b and TFTs 30 are arranged not in the aperture regions of the pixels but in the non-aperture region so as not to hinder display.

In FIG. 4 and FIG. 5, each of the TFTs 30 is formed to include a semiconductor layer 1a and gate electrodes 3a and 31b.

Each of the semiconductor layers 1a is, for example, formed of polysilicon and includes a channel region 1a' having a channel length along the Y direction in FIG. 4, a data line side LDD region 1b, a pixel electrode side LDD region 1c, a data line side source/drain region 1d and a pixel electrode side source/drain region 1e. That is, each of the TFTs 30 has an LDD structure. Note that the data line side LDD region 1b is one example of a "first junction region" according to the aspects of the invention, and the pixel electrode side LDD region 1c is one example of a "second junction region" according to the aspects of the invention.

The data line side source/drain region 1d and the pixel electrode side source/drain region 1e are formed in substantially mirror symmetry along the Y direction with respect to the channel region 1a'. The data line side LDD region 1b is formed between the channel region 1a' and the data line side source/drain region 1d. The pixel electrode side LDD region 1c is formed between the channel region 1a' and the pixel electrode side source/drain region 1e. The data line side LDD region 1b, the pixel electrode side LDD region 1c, the data line side source/drain region 1d and the pixel electrode side source/drain region 1e are impurity regions that are formed by implanting impurities into the semiconductor layer 1a by means of impurity implantation, such as ion implantation, for example. The data line side LDD region 1b and the pixel electrode side LDD region 1c are formed as lightly-doped impurity regions that respectively have smaller impurities than the data line side source/drain region 1d and the pixel electrode side source/drain region 1e. According to the above impurity regions, while the TFT 30 is not operating, it is possible to reduce an off current that flows through the source region and the drain region and also possible to suppress a decrease in on current that flows while the TFT 30 is operating. Note that the TFT 30 preferably has an LDD structure; however, the TFT 30 may have an offset structure in which impurities are not implanted in the data line side LDD region 1b and the pixel electrode side LDD region 1c, or may have a self-aligned structure in which the data line side source/drain region and the pixel electrode side source/drain region are formed by implanting impurities densely using the gate electrode as a mask.

As shown in FIG. 4 and FIG. 5, the gate electrode 3a is one example of a "gate electrode" according to the aspects of the invention, and is formed as a portion of the scanning line 11a or preferably formed integrally with the scanning line 11a. The scanning lines 11a are arranged in the upper layer than the semiconductor layers 1a through the insulating film 12, and are, for example, formed of conductive polysilicon. Each of the scanning lines 11a includes a first portion that extends along the X direction and a second portion that extends along the Y direction so as to overlap a region within the channel region 1a' of the TFT 30, which is not overlapped by the first portion. Within the above configured scanning line 11a, a portion that overlaps the channel region 1a' serves as a body portion 31a of the gate electrode 3a and substantially functions as a gate electrode. The gate electrode 3a and the semiconductor layer 1a are insulated by an insulating film 2 (see FIG. 5), which is one example of a "first insulating film" according to the aspects of the invention.

As shown in FIG. 4 and FIG. 5, in a lower layer than the semiconductor layers 1a, the gate electrodes 31b are formed as a portion of the scanning lines 11b that also function as the lower side light shielding films. The scanning lines 11b are arranged in a lower layer than the semiconductor layers 1a through a base insulating film 12, and are, for example, formed of light shielding conductive material, such as a high-melting point metal material that includes tungsten (W), titanium (Ti), titanium nitride (TiN), and the like. Each of the scanning lines 11b includes a main line portion 11bx that is patterned in a stripe along the X direction in plan view and an extended portion 11by that extends from the main line portion 11bx along the Y direction. Within the above configured scanning line 11b, a portion that overlaps the channel region 1a' functions as the gate electrode 31b. Each of the scanning lines 11b is formed to include regions that are opposed to the channel region 1a', the data line side LDD region 1b, the pixel electrode side LDD region 1c, the data line side source/drain region 1d and the pixel electrode side source/drain region 1e, of the TFT 30. Thus, owing to the scanning lines 11b, it is possible to substantially or completely shield the channel regions 1a' of the TFTs 30 against returned light, such as light reflected on the rear face of the TFT array substrate 10 and/or light that is emitted, in a double-plate projector, from another liquid crystal device and that penetrates through a composite optical system. That is, the scanning lines 11b are able to function as wirings that supply scanning signals and also to function as light shielding films for the TFTs 30 against returned light. Thus, while the liquid crystal device is operating, it is possible to reduce light leakage current in each of the TFTs 30 to improve the contrast ratio. Hence, a high-quality image display may be achieved.

The above configured scanning lines 11b, which serve as the lower side light shielding film, and the semiconductor layers 1a are insulated by the base insulating film 12, which is one example of a "second insulating film" according to the aspects of the invention. The base insulating film 12 not only has a function to insulate the TFTs 30 from the scanning lines 11b but also has a function to prevent the surface of the TFT array substrate 10 from being rough while polishing and a function to prevent the characteristics of the pixel switching TFT 30 from being degraded because of dirt that is left after washing, or the like, by forming the base insulating film 12 all over the TFT array substrate 10.

Thus, in the present embodiment, each of the TFTs 30 includes the semiconductor layer 1*a*, the gate electrode 3*a*, which is formed in an upper layer than the semiconductor layer 1*a* through the insulating film 2 and which constitutes a portion of the scanning line 11*a*, and the gate electrode 31*b*, which is formed in a lower layer than the semiconductor layer 1*a* through the base insulating film 12 and which constitutes a portion of the scanning line 11*b*. That is, each of the TFTs 30 has a double gate structure. Thus, it is possible to form channels on both the upper face side and the lower face side in the channel region 1*a*' of the semiconductor layer 1*a*. Thus, in comparison with the case where the gate electrode is formed on only one of the upper layer and the lower layer than the semiconductor layer 1*a*, it is possible to increase an on current of the TFT 30.

In FIG. 4, in the present embodiment, each of the gate electrodes 3*a* (in other words, a portion of the scanning line 11*a*) not only includes the body portion 31*a* but also includes first elongated portions 32*a* that extend along both sides of the pixel electrode side LDD region 1*c* of the semiconductor layer 1*a* and second elongated portions 32*b* that extend from the first elongated portions 32*a*. The second elongated portions 32*b* will be described in detail later. Thus, each gate electrode 3*a* has a so-called U-shaped light shielding structure that partly surrounds the pixel electrode side LDD region 1*c* on both sides thereof by the body portion 31*a*, which overlaps the channel region 1*a*', and the first elongated portions 32*a*. Although the detail will be described later, grooves 810 (not shown) are formed in the insulating film 2 and the base insulating film 12, and the gate electrode 31*a* has inner groove portions 33 which are formed so that portions of the first elongated portions 32*a* are formed in the grooves 810.

In FIG. 5, the storage capacitor 70 is provided in an upper layer than the TFT 30 on the TFT array substrate 10 through an interlayer insulating film 41.

The storage capacitor 70 is formed so that a lower capacitor electrode 71 and an upper capacitor electrode 300*a* are opposed to each other through a ∈ film 75.

The upper capacitor electrode 300*a* is formed as a portion of the capacitor line 300. Although the above configuration is not shown in the drawing, the capacitor lines 300 extend from the image display area 10*a*, in which the pixel electrodes 9*a* are arranged, to the periphery of the image display area 10*a*. The upper capacitor electrode 300*a* is electrically connected through the capacitor line 300 to a constant electric potential source. The upper capacitor electrode 300*a* is a fixed electric potential side capacitor electrode that is maintained at a fixed electric potential. The upper capacitor electrode 300*a* is, for example, formed of an opaque metal film that contains metal, such as Al (aluminum), Ag (silver), for example, or alloy of them, and functions as an upper side light shielding film (internal light shielding film) that shields the TFT 30. Note that, the upper capacitor electrode 300*a* may be, for example, formed of metal element substance, alloy, metal silicide, or polysilicide, which contains at least one of high-melting point metals, such as Ti (titanium), Cr (chromium), W (tungsten), Ta (tantalum), Mo (molybdenum), Pd (palladium), or a laminated structure of them.

Figure 6:
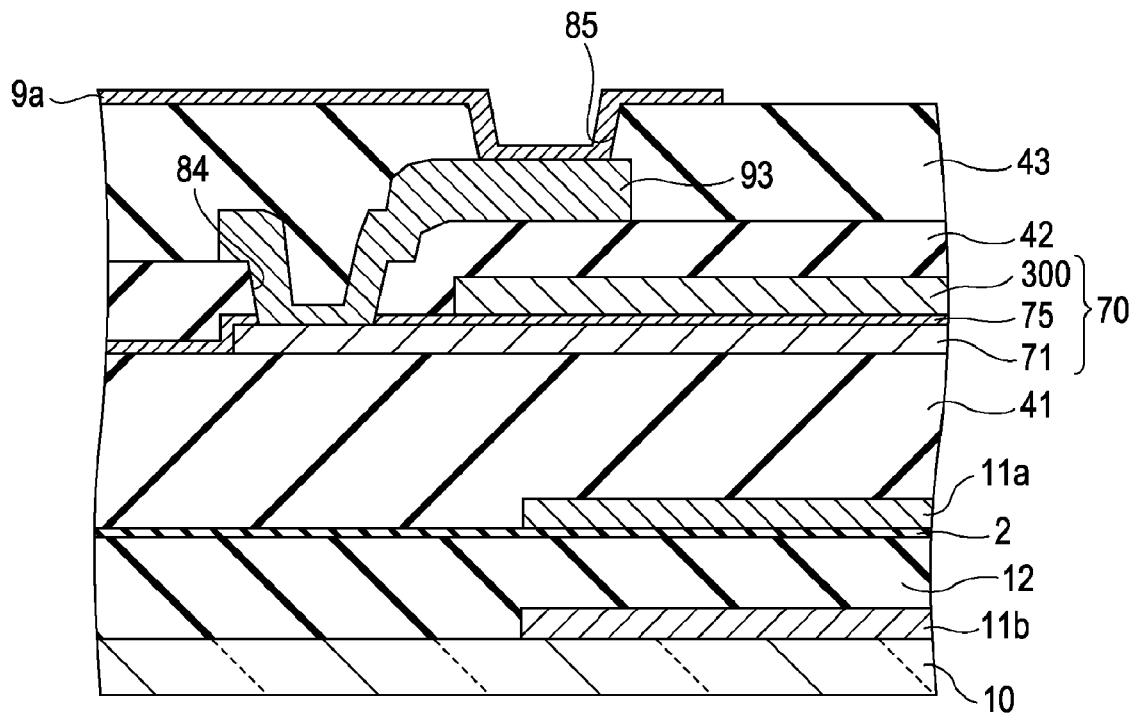
FIG. 6 is a cross-sectional view that is taken along the line VI-VI in FIG. 4.

In FIG. 4 to FIG. 6, the lower capacitor electrode 71 is a pixel electric potential side capacitor electrode that is electrically connected to both the pixel electrode side source/drain region 1*e* of the TFT 30 and the pixel electrode 9*a*. More specifically, the lower capacitor electrode 71 is electrically connected through a contact hole 83 (see FIG. 4 and FIG. 5) to the pixel electrode side source/drain region 1*e* and also electrically connected through a contact hole 84 (see FIG. 4 and FIG. 6) to a relay layer 93. Furthermore, the relay layer 93 is electrically connected through a contact hole 85 (see FIG. 4 and FIG. 6) to the pixel electrode 9*a*. That is, the lower capacitor electrode 71, in cooperation with the relay layer 93, relays electrical connection between the pixel electrode side source/drain region 1*e* and the pixel electrode 9*a*. The lower capacitor electrode 71 is formed of conductive polysilicon. Thus, the storage capacitor 70 has a so-called MIS structure. Note that the lower capacitor electrode 71 preferably not only functions as the pixel electric potential side capacitor electrode but also functions as a light absorption layer or a light shielding film arranged between the TFT 30 and the upper capacitor electrode 300*a*, which serves as the upper side light shielding film.

The ∈ film 75 has a monolayer structure or a multilayer structure, which is, for example, formed of silicon oxide film, such as HTO (High Temperature Oxide) film or LTO (Low Temperature Oxide) film, silicon nitride film, or the like.

Note that the lower capacitor electrode 71 may be formed of a metal film as in the case of the upper capacitor electrode 300*a*. That is, the storage capacitor 70 may be formed to have a so-called MIM structure having a three-layer structure: metal film—∈ film (insulating film)—metal film. In this case, in comparison with the case where the lower capacitor electrode 71 is formed of polysilicon, or the like, power consumed in the overall liquid crystal device while the liquid crystal device is being driven may be reduced, and elements in each pixel portion can operate at high speed.

In FIG. 5 and FIG. 6, the data line 6*a* and the relay layer 93 are provided in an upper layer than the storage capacitor 70 through the interlayer insulating film 42 on the TFT array substrate 10.

The data line 6*a* is electrically connected to the data line side source/drain region 1*d* of the semiconductor layer 1*a* through a contact hole 81 that extends through the interlayer insulating film 41, the ∈ film 75 and the interlayer insulating film 42. The data line 6*a* and the inside of the contact hole 81 are, for example, formed of a material that contains Al (aluminum), such as Al—Si—Cu or Al—Cu, Al element substance, or a multilayer film formed of Al layer and TiN layer. The data line 6*a* also has a function to shield the TFT 30 against light.

In FIG. 4 and FIG. 6, the relay layer 93 is formed in the same layer as the data line 6*a* (see FIG. 5) on the interlayer insulating film 42. The data line 6*a* and the relay layer 93 are, for example, formed in such a manner that a thin film formed of a conductive material, such as a metal film, is formed on the interlayer insulating film 42 using thin-film formation method, and the thin film is partly removed, that is, patterned. Thus, the data line 6*a* and the relay layer 93 are formed so as to be spaced apart from each other. Thus, because the data line 6*a* and the relay layer 93 may be formed in the same process, it is possible to simplify a manufacturing process of the device.

In FIG. 5 and FIG. 6, the pixel electrode 9*a* is formed in an upper layer than the data line 6*a* through the interlayer insulating film 43. The pixel electrode 9*a* is electrically connected through the lower capacitor electrode 71, the contact holes 83, 84 and 85, and the relay layer 93 to the pixel electrode side source/drain region 1*e* of the semiconductor layer 1*a*. The contact hole 85 is formed so that a conductive material, such as ITO, that constitutes the pixel electrode 9*a* is deposited on the inner wall of a hole portion that is formed to extend through the interlayer insulating film 43. An alignment layer 16, on which a predetermined alignment process, such as rubbing process, has been performed, is provided on the upper surface of the pixel electrode 9a.

The configuration of the pixel portion as described above is common to the pixel portions as shown in FIG. 4. The above configured pixel portion is regularly formed in the image display area 10a (see FIG. 1).

Next, the configuration of the gate electrode 3a of the TFT 30, which has a characteristic configuration in the present embodiment will be described with reference to FIG. 7 to FIG. 10.

Figure 7:
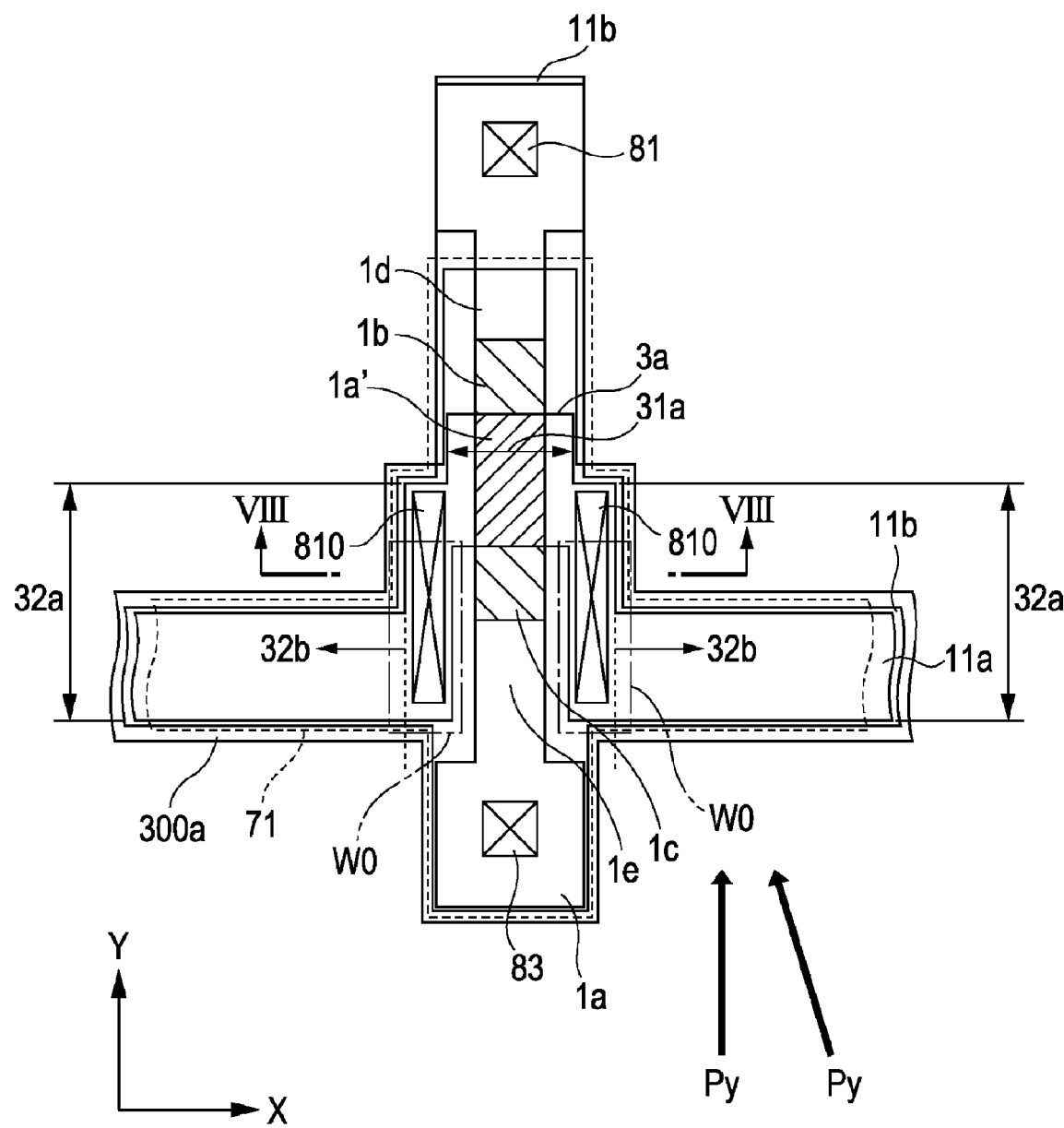
FIG. 7 is a plan view that shows a configuration of a transistor, focusing on the arrangement of a gate electrode to the transistor.
Figure 8:
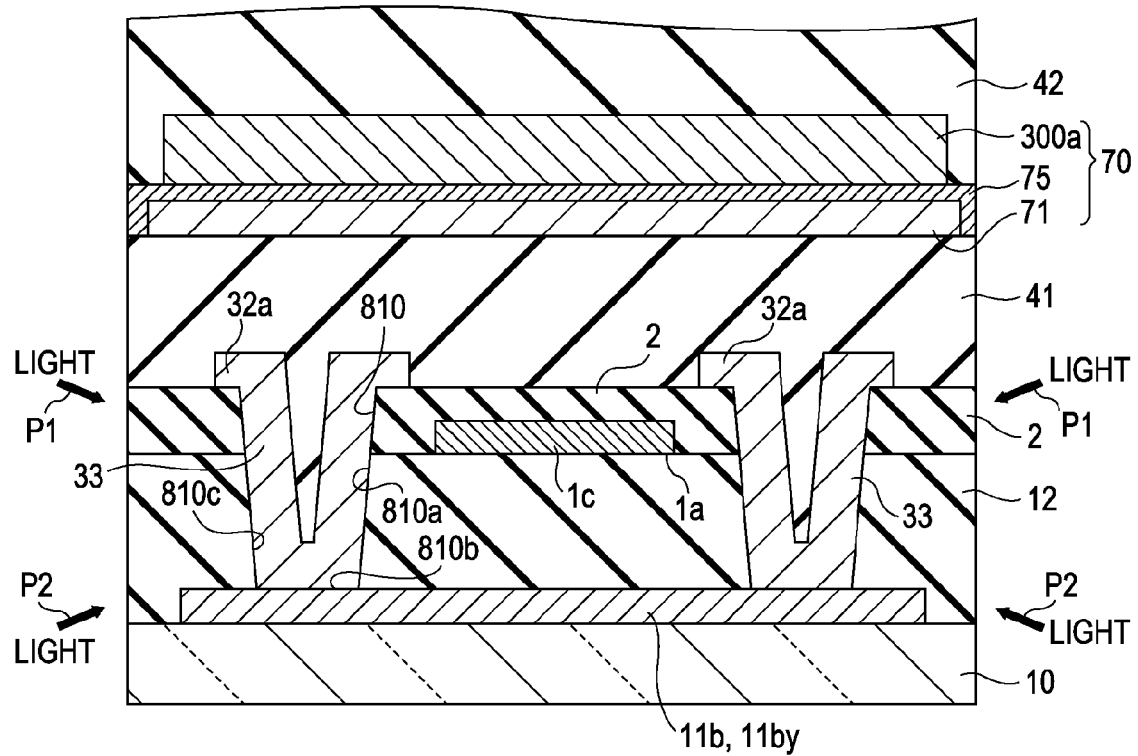
FIG. 8 is a cross-sectional view that is taken along the line VIII-VIII in FIG. 7, showing a configuration of layers from a lower side light shielding film to a storage capacitor in cross section.

FIG. 7 is a plan view that shows a configuration of the transistor, focusing on the arrangement of the gate electrode to the transistor. FIG. 8 is a cross-sectional view that is taken along the line VIII-VIII in FIG. 7, showing a configuration of layers from the lower side light shielding film to the storage capacitor in cross section. Note that, in FIG. 8, in correspondence with FIG. 7, the configuration is shown focusing on the arrangement relationship among the lower side light shielding film 11b, the TFT 30 and the storage capacitor 70, which constitute the pixel portion.

Figure 9:
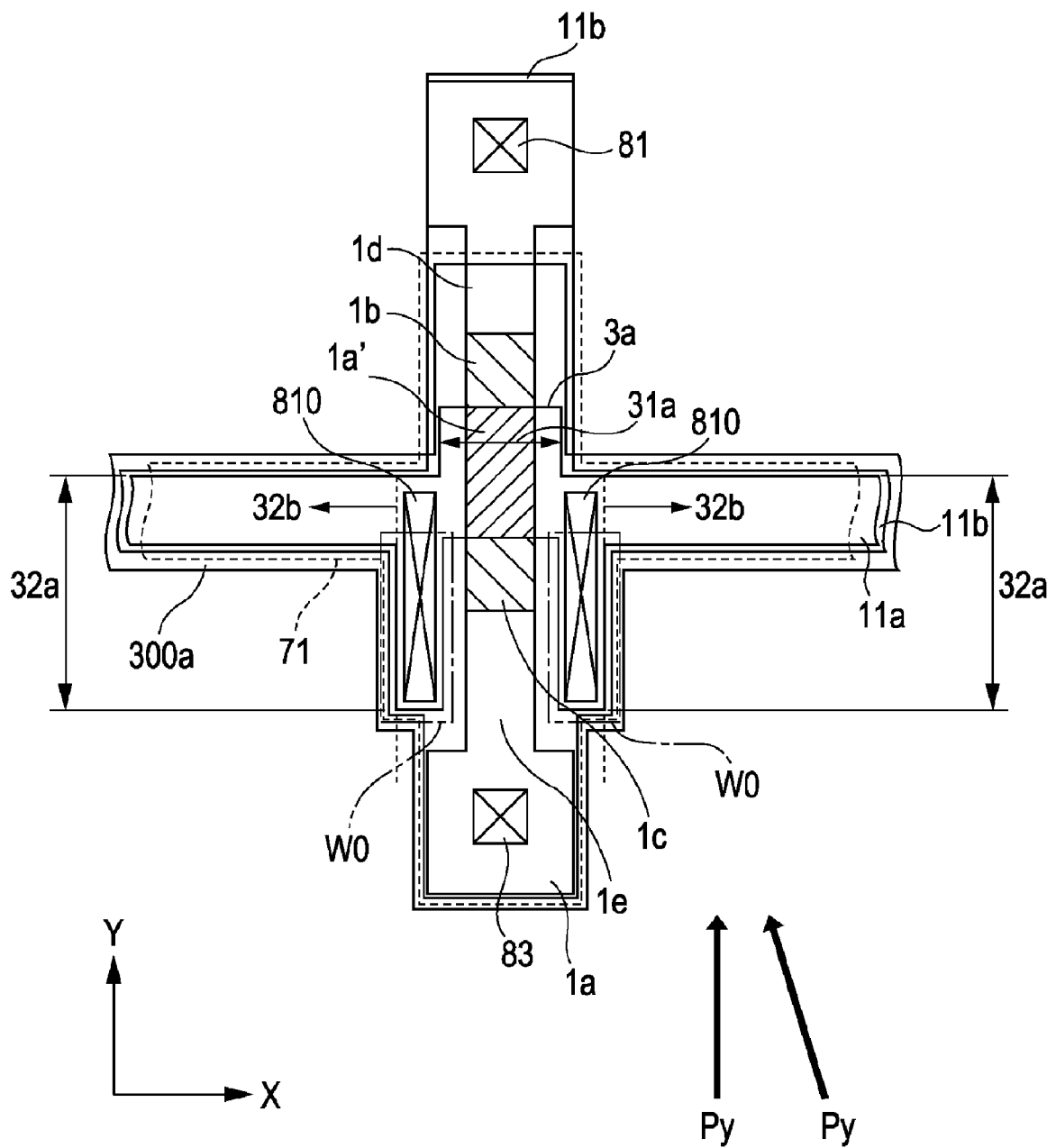
FIG. 9 is a plan view that shows a configuration of a transistor, focusing on the arrangement of a gate electrode to the transistor according to a comparative embodiment.
Figure 10A:
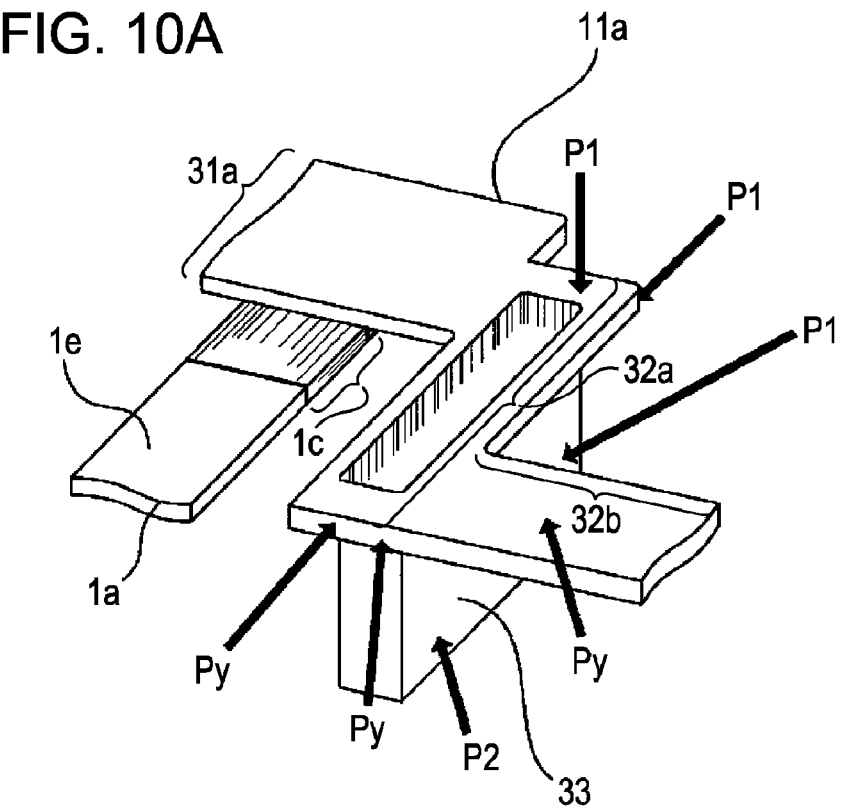
FIG. 10A is a view that illustrates a function of the gate electrode according to the embodiment.
Figure 10B:
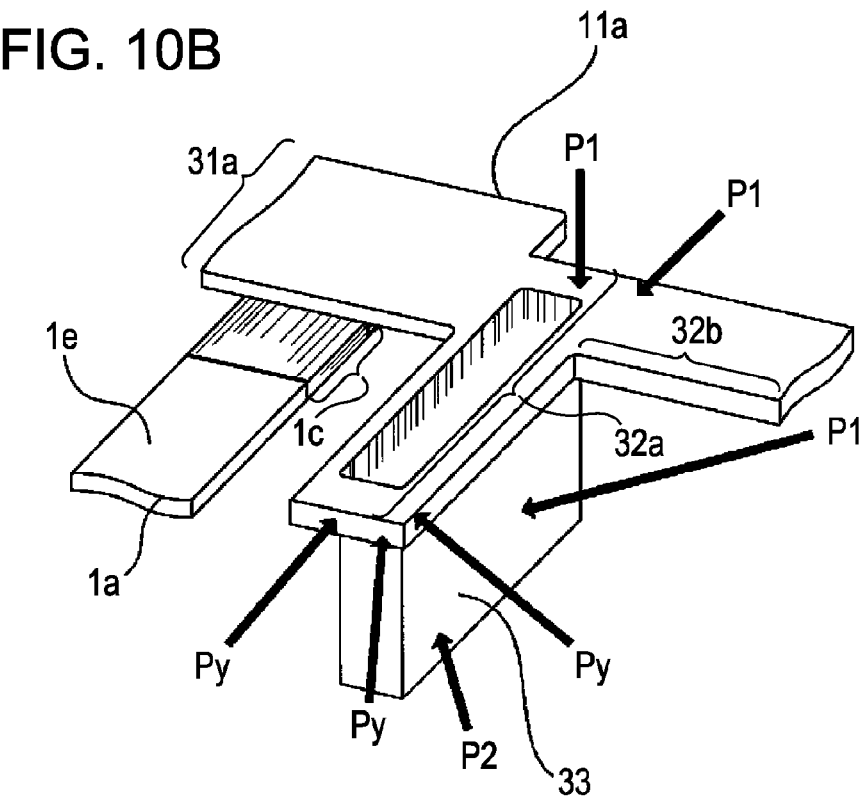
FIG. 10B is a view that illustrates a function of the gate electrode according to the comparative embodiment.

FIG. 9 is a plan view that shows a configuration of the transistor, focusing on the arrangement of the gate electrode to the transistor according to a comparative embodiment. Moreover, FIG. 10A is a view that illustrates a function of the gate electrode according to the present embodiment. FIG. 10B is a view that illustrates a function of the gate electrode according to the comparative embodiment.

In FIG. 7, in an upper layer than the semiconductor layer 1a, the gate electrode 3a includes the body portion 31a, the first elongated portions 32a, and the second elongated portions 32b. The body portion 31a is a portion that substantially functions as a gate electrode. As described with reference to FIG. 3, while the liquid crystal device is operating, as a scanning signal is supplied from the scanning line 11a and a gate voltage corresponding to the scanning signal is applied to the body portion 31a, the TFT 30 enters an on state.

In addition, the first elongated portions 32a extend from the body portion 31a that extends along the X direction in FIG. 7 so as to overlap the channel region 1a' in plan view to adjoining regions W0 in such a manner that the first elongated portions 32a bend to extend on both sides of the semiconductor layer 1a along the Y direction indicated in the drawing. In the non-aperture region, each of the adjoining regions W0 is a region that continuously adjoins from the pixel electrode side LDD region 1c to the pixel electrode side source/drain region 1e along the Y direction in FIG. 7. The first elongated portions 32a are arranged so that the adjoining regions W0 on both sides of the semiconductor layer 1a at least partly adjoin the pixel electrode side LDD region 1c.

Here, FIG. 10A is a schematic view that shows the arrangement relationship among the body portion 31a of the gate electrode 3a, the first elongated portion 32a and the inner groove portion 33 of the first elongated portion 32a, the second elongated portion 32b, the pixel electrode side LDD region 1c and pixel electrode side source/drain region 1e of the semiconductor layer 1a, focusing on one side of the semiconductor layer 1a (on the right side to the semiconductor layer 1a in FIG. 7). Note that the same also applies to FIG. 10B and FIG. 20, which will be described later.

In FIG. 10A, in the immediately upper layer than the semiconductor layer 1a through the insulating film 2 (not shown in the drawing), the first elongated portion 32a is able to block light (for example, light that travels along directions indicated by arrows P1 and Py in the drawing) that will enter, from the upper layer thereof, at least the pixel electrode side LDD region 1c of the semiconductor layer 1a that adjoins the first elongated portion 32a. Here, in FIG. 10A, an example of a traveling direction of light that has a component along the Y direction shown in FIG. 7 is indicated by the arrow Py.

As described with reference to FIG. 4 to FIG. 6, for example, in an upper layer than the TFT 30 through the interlayer insulating film 41 or 42, the data line 6a and the storage capacitor 70 are arranged relative to the TFT 30 so as to be able to block light that travels from the upper layer of the TFT 30 toward the TFT 30. In comparison with the case where light is blocked by these various components, owing to the first elongated portion 32a, it is possible to further reduce light that will penetrate into the lower layer of the first elongated portion 32a and enter at least the pixel electrode side LDD region 1c of the semiconductor layer 1a.

Here, as will be described in detail later, the inventors of the present application have found that, while the TFT 30 is operating, light leakage current tends to occur in the pixel electrode side LDD region 1c as compared with the data line side LDD region 1b. In this case, when light is irradiated to the pixel electrode side LDD region 1c while the TFT 30 is operating, light leakage current tends to occur in the TFT 30 as compared with the case where light is irradiated to the data line side LDD region 1b. Thus, by enhancing a light shielding property to the pixel electrode side LDD region 1c at which light leakage current relatively tends to occur, it is possible to effectively reduce light leakage current flowing through the TFT 30.

In addition, in view of avoiding a decrease in aperture ratio, providing the first elongated portions 32a, or the like, not on both the pixel electrode side LDD region 1c and the data line side LDD region 1b in view of a light shielding property but only on any one of the pixel electrode side LDD region 1c and the data line side LDD region 1b may achieve both the effect related to a light shielding property and the effect related to aperture ratio.

In addition, in the present embodiment, as shown in FIG. 7, each of the first elongated portions 32a is preferably arranged in the adjoining region W0 so that the first elongated portion 32a not only adjoins the pixel electrode side LDD region 1c but also at least partly and continuously adjoins the pixel electrode side source/drain region 1e. Thus, owing to the first elongated portions 32a, it is possible to block light that will enter the pixel electrode side LDD region 1c and at least a portion of the pixel electrode side source/drain region 1e in the semiconductor layer 1a from the upper layer thereof. Note that, in the present embodiment, the first elongated portions 32a may be arranged in the adjoining regions W0 so as to adjoin only the pixel electrode side LDD region 1c of the semiconductor layer 1a. However, in comparison with the above configuration, in the configuration shown in FIG. 7, because light that will enter the pixel electrode side LDD region 1c, as is apparent from FIG. 10A, can be blocked by the first elongated portions 32a with a wider area in the adjoining regions W0, it is possible to improve a light shielding property to the semiconductor layer 1a.

In addition, as shown in FIG. 7 and FIG. 8, the grooves 810 are formed to extend longitudinally along the Y direction indicated in FIG. 7 so that the grooves 810 are arranged to partly overlap the corresponding first elongated portions 32a, as viewed in plan, at least in the insulating film 2. The grooves 810 are formed along at least the pixel electrode side LDD region 1c of the semiconductor layer 1a so as to overlap the corresponding first elongated portions 32a, as viewed in plan, arranged on both sides of the semiconductor layer 1a.

In the present embodiment, in FIG. 8, each of the grooves 810 not only extends through the insulating film 2 but also extends through the base insulating film 12, so that each of the grooves 810 is formed to expose the surface of the scanning line 11b (more accurately, the scanning line 11by). In addition, each groove 810 extends to a position that overlaps a portion of the first elongated portion 32a, which adjoins the pixel electrode side source/drain region 1e, in plan view in the insulating film 2 and in the base insulating film 12. That is, as shown in FIG. 7, in this case, the grooves 810 are formed along both the pixel electrode side LDD region 1c and the pixel electrode side source/drain region 1e in plan view.

Each first elongated portion 32a has the inner groove portion 33 that extends inside the above formed groove 810. Each of the inner groove portions 33 is preferably formed inside the groove 810 along an inner wall portion 810a on the side of the semiconductor layer 1a, an outer wall portion 810c opposite the inner wall portion 810a, and a bottom portion 810b. Thus, as viewed three-dimensionally, the inner groove portions 33 each are formed as a wall-shaped light shielding body that extends along from the pixel electrode side LDD region 1c to the pixel electrode side source/drain region 1e of the semiconductor layer 1a.

Thus, as shown in FIG. 8 or FIG. 10A, light that travels along a direction indicated, for example, by the arrow P1 in the drawing and will enter at least the pixel electrode side LDD region 1c of the semiconductor layer 1a in addition to light that enters from the upper layer thereof and, further, returned light that travels through the TFT array substrate 10 from the lower layer thereof along a direction, for example, as indicated by the arrow P2 and will enter at least the pixel electrode side LDD region 1c of the semiconductor layer 1a may be blocked by the inner groove portion 33. In addition, according to the configuration of the inner groove portion 33, in the semiconductor layer 1a, it is possible to block light that will enter the pixel electrode side LDD region 1c and at least a portion of the pixel electrode side source/drain region 1e. Then, in this manner, light that travels toward the pixel electrode side LDD region 1c of the semiconductor layer 1a is blocked by the inner groove portion 33 in the adjoining region W0 with a wider area, so that it is possible to improve a light shielding property to the pixel electrode side LDD region 1c.

In addition, as shown in FIG. 8, the inner groove portion 33 contacts the surface of the lower side light shielding film 11b in the groove 810 formed to extend through the insulating film 2 and the lower side insulating film 12, so that the inner groove portion 33 is electrically connected to the lower side light shielding film 11b, which serves as a scanning line that overlaps the channel region 1a' of the semiconductor layer 1a in plan view. That is, the groove 810 is formed as a contact hole through which the gate electrode 3a is electrically connected to the scanning line 11b by the inner groove portion 33. Thus, as described with reference to FIG. 4 to FIG. 6, a portion of the lower side light shielding film 11b, which overlaps the channel region 1a', may be used to function as a gate electrode of the TFT 30.

In addition, the depth of the groove 810 is greater than an interlayer distance from the upper surface of the insulating film 2 to the upper surface of the semiconductor layer 1a. Thus, owing to the inner groove portion 33 formed inside the groove 810, it is possible to further improve a light shielding property against light that will enter the semiconductor layer 1a, as described above, between the lower side light shielding film 11b and the gate electrode 3a on the TFT array substrate 10. Thus, between the lower side light shielding film 11b and the gate electrode 3a, it is possible to reliably reduce light that enters the semiconductor layer 1a.

Moreover, in FIG. 7, the first elongated portions 32a are preferably arranged so as to partly adjoin the channel region 1a' of the semiconductor layer 1a. That is, in the present embodiment, as a shape for ensuring a configuration such that portions of the first elongated portions 32a, arranged in the adjoining regions W0, adjoin at least the pixel electrode side LDD region 1c, it is desirable to provide a portion of the first elongated portion 32a, adjacent to the channel region 1a', outside the adjoining regions W0 with a necessary minimum area of arrangement. In this manner, owing to the configuration, or layout, regarding the arrangement of components in the non-aperture region of the pixels, it is possible to prevent a decrease in aperture ratio because of the shape of the gate electrodes 3a.

Furthermore, each of the second elongated portions 32b extends from at least a portion of the first elongated portion 32a, arranged in the adjoining region W0, and bends to extend along the X direction in FIG. 7. In the present embodiment, the second elongated portions 32b extend on both sides of the semiconductor layer 1a from portions of the first elongated portions 32a, closer to the pixel electrode side source/drain region 1e than the pixel electrode side LDD region 1c, in the adjoining region W0. In the gate electrode 3a, at least the second elongated portions 32b are preferably formed integrally with the same film as the scanning line 11a. According to the above configuration, because, in a manufacturing process of liquid crystal device, at least the second elongated portions 32b and the scanning line 11a can be formed in the same process with the same film at the same time in the gate electrode 3a, it is possible to further simplify the manufacturing process.

Here, a comparative embodiment to the present embodiment will be described with reference to FIG. 9 and FIG. 10B. Hereinafter, in regard to the comparative embodiment, only the portions different from the present embodiment will be described, the same reference numerals as those shown in FIG. 7, or the like, are assigned to the same configuration shown in FIG. 9 and FIG. 10B, and a description thereof may be omitted.

According to the comparative embodiment, the gate electrode 3a, as in the case of the present embodiment, is formed of the body portion 31a, the first elongated portions 32a that have the inner groove portions 33 inside the grooves 810, and the second elongated portions 32b. Each of the second elongated portions 32b extends from a portion of the first elongated portion 32a, arranged outside the adjoining region W0, along the X direction in FIG. 9.

In FIG. 10B, particularly focusing on the arrangement relationship between the pixel electrode side LDD region 1c of the semiconductor layer 1a and the second elongated portion 32b, as regards, in the drawing, light that travels, for example, along directions indicated by the arrows P1, P2, Py toward the semiconductor layer 1a, the light is blocked in the adjoining region W0 by a portion of the first elongated portion 32a and the inner groove portion 33. However, according to the above configuration, in the case where light is intensively irradiated from a predetermined direction toward the adjoining region W0 in a pixel, when light is blocked only by a portion of the first elongated portion 32a and the inner groove portion 33, there is a possibility that a large amount of light may penetrate to enter the pixel electrode side LDD region 1c of the semiconductor layer 1a. Furthermore, particularly, on the side of the side face extending along the X direction among the side faces of a portion of first elongated portion 32a and the inner groove portion 33 in the adjoining region W0, a surface area is small as compared with the side of the side face that extends along the longitudinal Y direction. Therefore, when light travels, for example, along the direction indicated by the arrow Py to be intensively irradiated to the side of the above side face extending along the X direction, a large amount of light penetrates to be irradiated to the pixel electrode side LDD region 1c of the semiconductor layer 1a and, hence, there is a possibility that a light shielding property is degraded.

In contrast, as shown in FIG. 7 or FIG. 10A, in the present embodiment, the second elongated portion 32b is provided continuously to part of or substantially entire portion of the first elongated portion 32a, arranged in the adjoining region W0. In this manner, it is possible to apparently increase an area of arrangement of at least part of a portion of the first elongated portion 32a, arranged in the adjoining region W0, on the TFT array substrate 10 by an amount of the second elongated portion 32b. Thus, among rays of light that travel toward at least the pixel electrode side LDD region 1c of the semiconductor layer 1a, light that enters at least part of a portion of the first elongated portion 32a, arranged in the adjoining region W0, may be blocked with a wider area by providing the second elongated portion 32b. Thus, owing to the second elongated portion 32b, it is possible to enhance a light shielding property of at least part of a portion of the first elongated portion 32a, arranged in the adjoining region W0, to at least the pixel electrode side LDD region 1c of the semiconductor layer 1a.

With the configuration of the second elongated portion 32b according to the present embodiment, particularly, at a portion of the first elongated portion 32a, arranged in the adjoining region W0, the second elongated portion 32b extends from a portion of the side face on the side the first elongated portion 32a extends along the X direction. Thus, apparently, with regards the side face on the side the first elongated portion 32a extends along the X direction, a surface area thereof may be increased by an amount of the side face on the side the second elongated portion 32b extends along the X direction.

Thus, in FIG. 7 or FIG. 10A, it is possible to block light that travels toward the semiconductor layer 1a, for example, along the direction indicated by the arrow Py to the side face on the side the first elongated portion 32a extends along the X direction with a wider area. Thus, as described above, at a portion of the first elongated portion 32a, arranged in the adjoining region W0, it is possible to enhance a light shielding property by the side face on the side extending along the X direction, from which light tends to penetrate, particularly, in comparison with the side face on the side extending longitudinally along the Y direction in FIG. 7.

As described above, in the present embodiment, a light shielding property against light that will enter the pixel electrode side LDD region 1c of the semiconductor layer 1a, where light leakage current particularly tends to occur, may be improved by the first elongated portions 32a and the second elongated portions 32b provided on both sides of the pixel electrode side LDD region 1c. As a result, it is possible to further reduce light leakage current in the semiconductor layer 1a of the TFT 30. Note that, in the present embodiment, any one or all of the first elongated portion 32a, inner groove portion 33 and second elongated portion 32b may be provided only on one side of the semiconductor layer 1a (on the left side or on the right side to the semiconductor layer 1a). For example, of the adjoining regions W0 on both sides of the semiconductor layer 1a, when light is intensively irradiated to one of the adjoining regions W0 and light leakage current may be reduced by blocking this intensive light, even when the first elongated portion 32a, and the like, is arranged in one of the adjoining regions W0, a reasonable effect may be expected and an aperture ratio may also be improved.

Thus, in the liquid crystal device according to the present embodiment, while the device is operating, it is possible to prevent the occurrence of display defects or to reduce a degree of display defect to such a degree that, on the display, it is not recognized as a display defect, because of an occurrence of light leakage current of the TFT 30. Hence, it is possible to display a high-quality image.

Next, an alternative embodiment to the present embodiment will be described with reference to FIG. 11 and FIG. 12.

First, one configuration of the alternative embodiment will be described with reference to FIG. 11.

Figure 11:
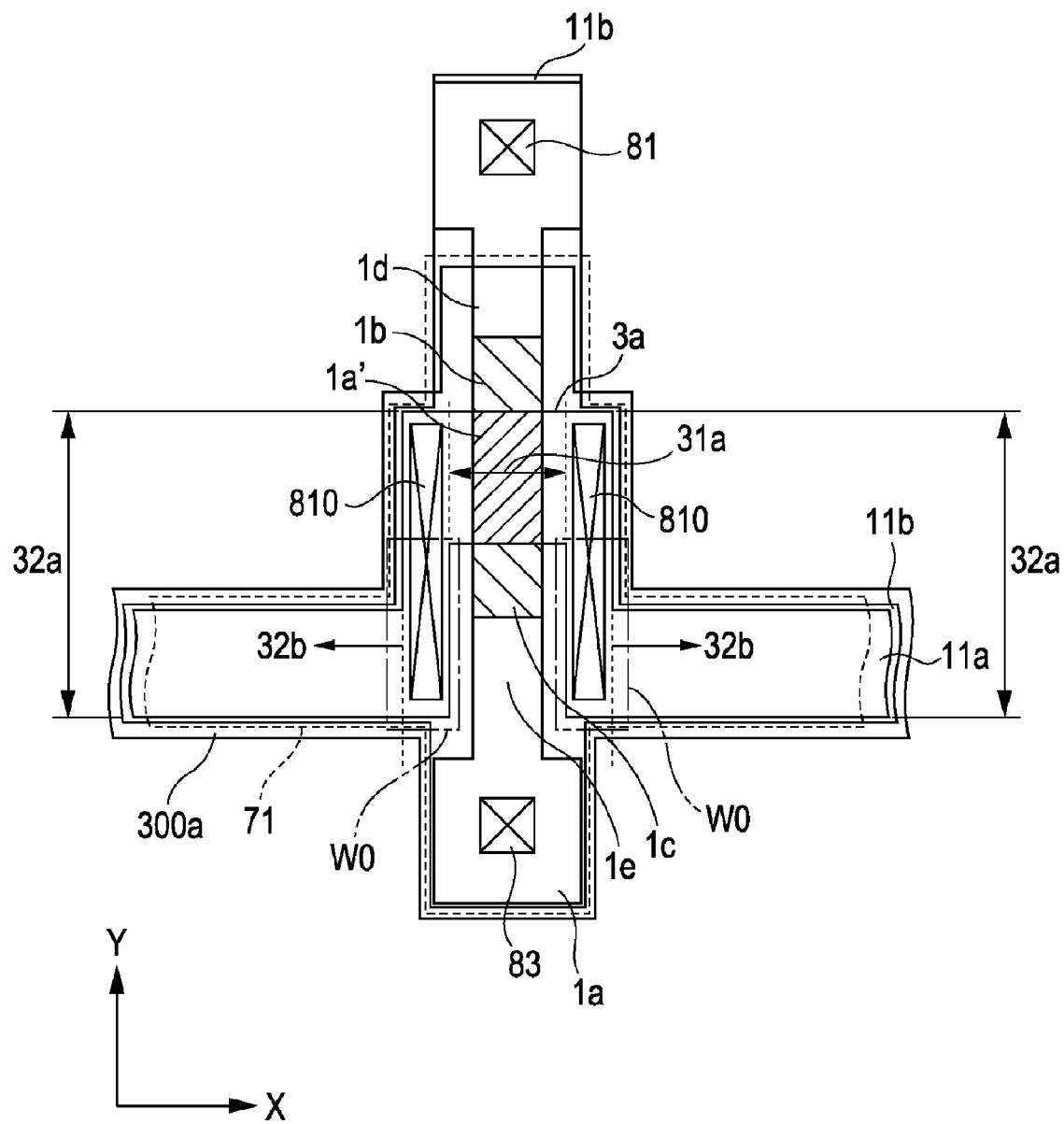
FIG. 11 is a plan view of a transistor, focusing on the arrangement of a gate electrode to the transistor according to one configuration of an alternative embodiment.

FIG. 11 is a plan view of a transistor, focusing on the arrangement of a gate electrode to the transistor according to one configuration of the alternative embodiment.

In FIG. 11, the first elongated portions 32a are preferably arranged so as to substantially entirely adjoin the channel region 1a' of the semiconductor layer 1a. In addition, in accordance with the above configuration, the grooves 810 may be arranged at portions that partly overlap portions of the first elongated portions 32a, which adjoin the channel region 1a', in plan view at least in the insulating film 2.

With this configuration, because the first elongated portions 32a are formed to adjoin the channel region 1a' of the semiconductor layer 1a between the body portion 31a and the adjoining regions W0, it is possible to block light that will enter the channel region 1a'.

Furthermore, at least in the insulating film 2, the grooves 810 are formed to extend along from the pixel electrode side LDD region 1c to the channel region 1a', so that the inner groove portions 33 of the first elongated portions 32a may be formed as wall-shaped light shielding bodies that extend along from the pixel electrode side LDD region 1c to the channel region 1a'. Thus, it is possible to block light that will enter the channel region 1a' by the inner groove portions 33 as well.

Thus, it is possible to improve a light shielding property to the channel region 1a' of the semiconductor layer 1a, so that it is possible to further effectively reduce light leakage current. Moreover, on the side of the channel region 1a' as well, light that will enter the pixel electrode side LDD region 1c may be blocked by portions of the first elongated portions 32a outside the adjoining regions W0, so that it is possible to further improve a light shielding property to the pixel electrode side LDD region 1c.

Next, another configuration according to the alternative embodiment will be described with reference to FIG. 12.

Figure 12:
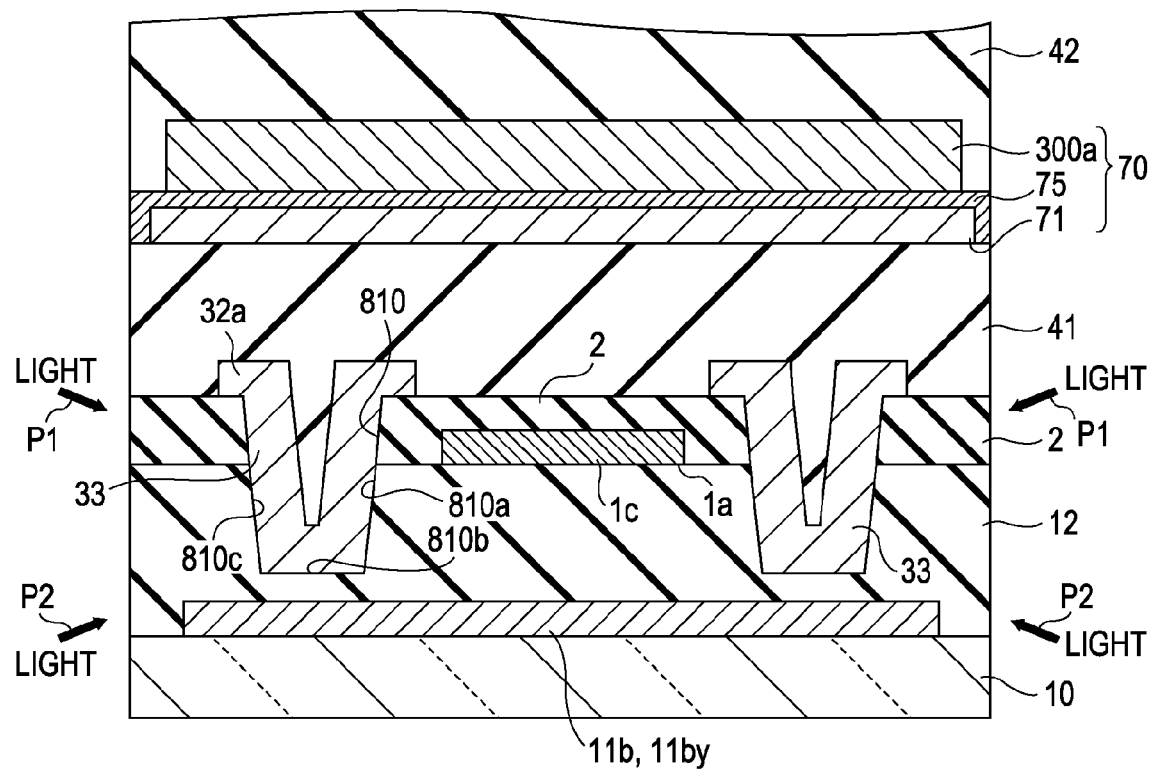
FIG. 12 is a cross-sectional view that shows a configuration of layers in cross section, corresponding to FIG. 8, according to another configuration of an alternative embodiment.

FIG. 12 is a cross-sectional view that shows a configuration of layers in cross section, corresponding to FIG. 8, according to another configuration of the alternative embodiment.

In FIG. 12, it may be configured so that the inner groove portions 33 are not electrically connected to the lower side light shielding film 11b, which serves as a scanning line. In this case, by providing the grooves 810 that extend through the insulating film 2 to a portion of the upper layer of the base insulating film 12 to thereby form the inner groove portions 33 along the inner wall portions 810a, outer wall portions 810c, and bottom portion 810b of the groove 810, a wall may be formed from the upper surface of the insulating film 2 to a lower layer than the semiconductor layer 1a. In this case as well, it is possible to obtain the same advantageous effects as those of the configuration described with reference to FIG. 8, that is, on the TFT array substrate 10, and the advantageous effects may be obtained so that a light shielding property is further improved against light that will enter the semiconductor layer 1a between the lower side light shielding film 11b and the gate electrode 3a.

Note that the scanning line 11b may be configured not to be supplied with a scanning signal. That is, the scanning line 11b may be configured to function as a light shielding film only.

Here, the reason why light leakage current tends to occur in the pixel electrode side LDD region 1c while the TFT 30 is operating as described above, in comparison with the data line side LDD region 1b, will be described in detail with reference to FIG. 13 to FIG. 18.

First, the measured results that were obtained by measuring the magnitude of drain current when light is irradiated to a testing TFT will be described with reference to FIG. 13. Here, FIG. 13 is a graph that shows a relationship, in a testing TFT, between a light irradiated portion and a drain current.

Figure 13:
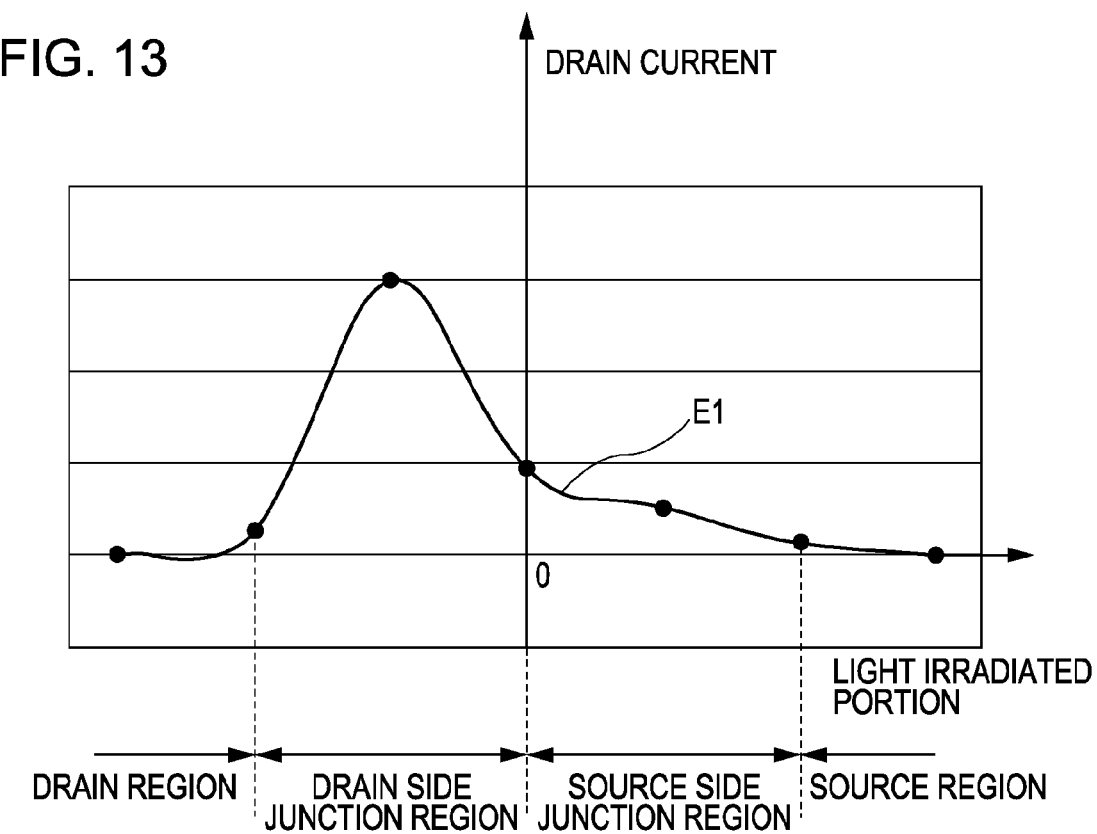
FIG. 13 is a graph that shows a relationship, in a testing TFT, between a light irradiated portion and a drain current.

In FIG. 13, data E1 are results obtained by measuring the magnitude of drain current when a light spot (visible light laser of approximately 2.4 um) is irradiated to a testing single TFT, that is, TEG (Test Element Group), while being scanned sequentially from the drain region side to the source region side. The TEG has, in addition to the channel region, the source region and the drain region, a source side junction region formed at a junction between the channel region and the source region and a drain side junction region formed at a junction between the channel region and the drain region.

Note that the abscissa axis of FIG. 13 represents light irradiated portion to which a light spot is irradiated, and the boundary between the channel region and the drain side junction region, the boundary between th channel region and the source side junction region, and further the channel region are defined as zero. The ordinate axis of FIG. 13 represents the magnitude of drain current (however, a relative value that is normalized using a predetermined value). The ordinate axis indicates a positive value (that is, a plus value) when the drain current flows from the drain region to the source region. The ordinate axis indicates a negative value (that is, a minus value) when the drain current flows from the source region to the drain region.

In FIG. 13, the data E1 indicate a plus value at any light irradiated portions. That is, the data E1 indicate that the drain current flows from the drain region to the source region. In addition, the data E1 indicate a larger value in the drain side junction region than in the source side junction region. That is, the data E1 indicate that the drain current is larger when a light spot is irradiated to the drain side junction region than when a light spot is irradiated to the source side junction region. In other words, light leakage current becomes larger when a light spot is irradiated to the drain side junction region than when a light spot is irradiated to the source side junction region. Note that the drain current is composed of dark current (or a subthreshold leakage, that is, leakage current that flows, in an off state of TEG, between the source region and the drain region even in a state where light is not irradiated) and light leakage current (or photoexcited current, that is, current that is generated because of excited electron by irradiating light).

Figure 14:
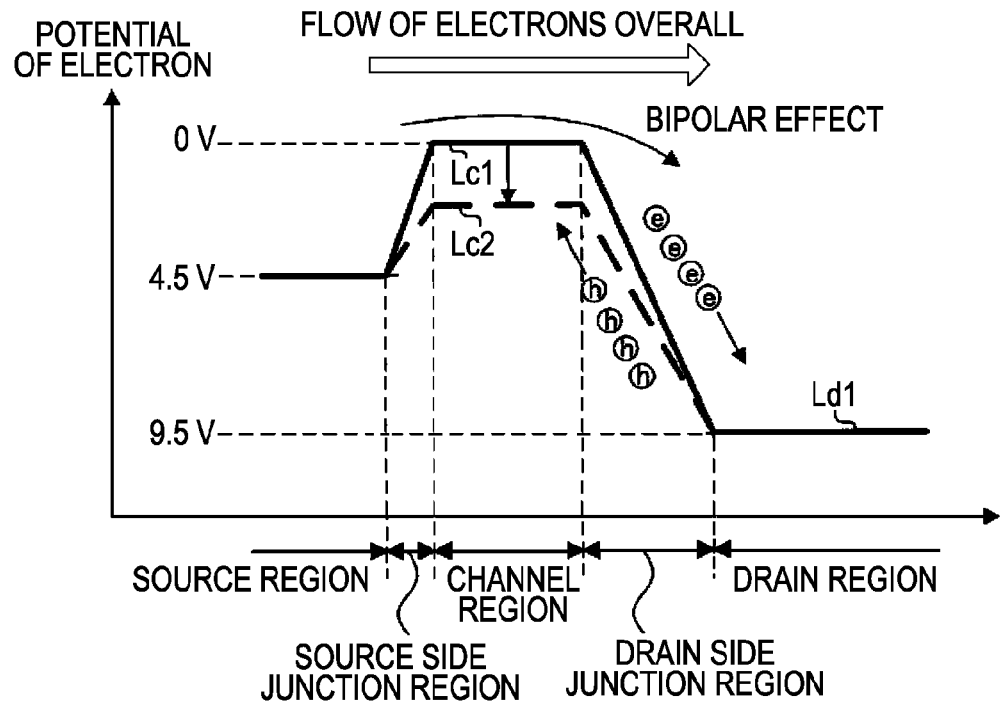
FIG. 14 is a conceptional diagram that shows the behavior of a carrier when photoexcitation occurs in a drain side junction region.
Figure 15:
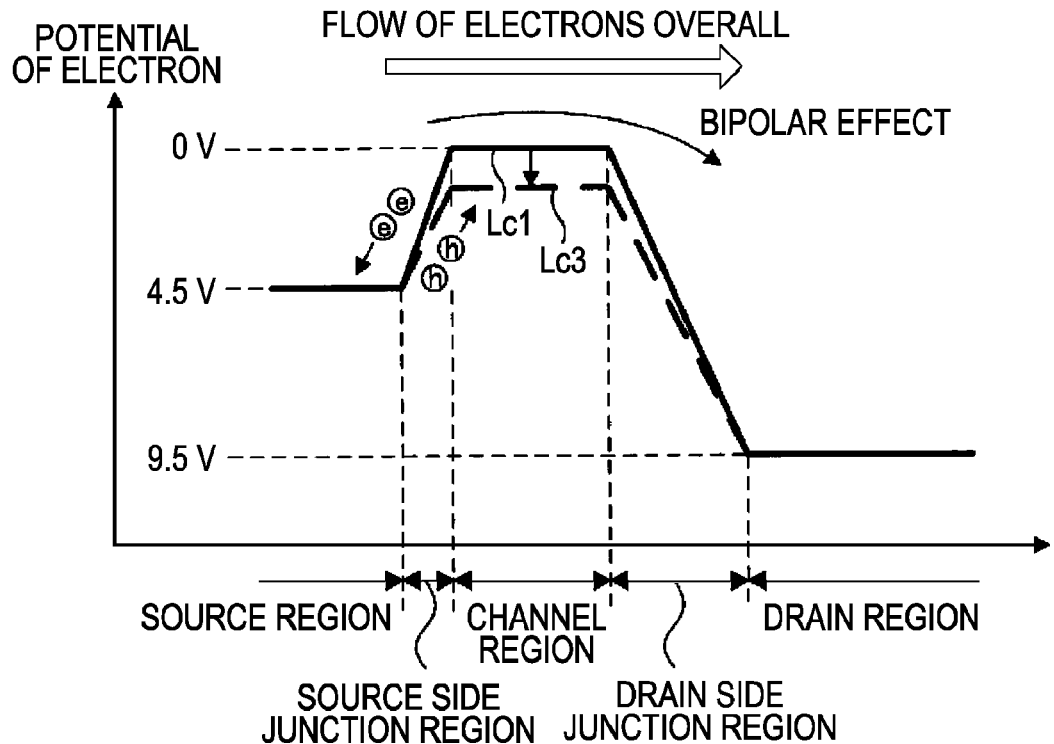
FIG. 15 is a conceptional diagram that shows the behavior of a carrier when photoexcitation occurs in a source side junction region.

Next, mechanism in which light leakage current becomes larger when a light spot is irradiated to the drain side junction region than when a light spot is irradiated to the source side junction region will be described with reference to FIG. 14 and FIG. 15. Here, FIG. 14 is a conceptional diagram that shows the behavior of a carrier when photoexcitation occurs in the drain side junction region. FIG. 15 is a conceptional diagram that shows the behavior of a carrier when photoexcitation occurs in the source side junction region. Note that, in FIG. 14 and FIG. 15, by assuming display of a middle gray scale in the pixel electrode 9a that is electrically connected to the above described TFT 30, the source electric potential (that is, the electric potential of the source region) is 4.5 V, the gate electric potential (that is, the electric potential of the channel region) is 0 V, and the drain electric potential (that is, the electric potential of the drain region) is 9.5 V. The abscissa axes of FIG. 14 and FIG. 15 each represent regions in the semiconductor layer that constitutes the TEG. The ordinate axes of FIG. 14 and FIG. 15 each represent a potential of electron (Fermi level). Electron has a negative electric charge, so that the potential of electron becomes lower the higher the electric potential is in the region, and the potential of electron becomes higher the lower the electric potential is in the region.

FIG. 14 shows the behavior of a carrier when a light spot is irradiated to the drain side junction region formed between the channel region and the drain region and then photoexcitation occurs in the drain side junction region.

In FIG. 14, light leakage current may be estimated to be composed of two current components.

That is, as a first current component, the light leakage current has a current component because of movement of electrons generated by photoexcitation. More specifically, the first current component is a current component that is generated when electrons (see "e" in the drawing) generated by photoexcitation in the drain side junction region move from the drain side junction region to the drain region having a lower potential (this current component flows from the drain region to the source region).

As a second current component, the light leakage current has a current component because of movement of holes (that is, positive holes, denoted by "h" in the drawing) generated by photoexcitation. More specifically, the second current component is a current component because of the bipolar effect that is generated when holes generated by photoexcitation in the drain side junction region move from the drain side junction region to the channel region having a lower potential (that is, higher potential as to electrons). That is, the current component (this current component flows from the drain region to the source region) is due to the effect such that electrons that move from the source region to the drain region increase because the potential of the channel region (that is, a base potential) is reduced from a potential Lc1 to a potential Lc2 because of positive electric charges of holes that have moved to the channel region. Thus, when photoexcitation occurs in the drain side junction region, both the first current component and the second current component are generated in a direction (that is, in a direction from the drain region to the source region) to increase the drain current (in other words, collector current).

FIG. 15 shows the behavior of a carrier when a light spot is irradiated to the source side junction region formed between the channel region and the source region and then photoexcitation occurs in the source side junction region.

In FIG. 15, light leakage current may be estimated to be dominantly composed of the second current component due to the bipolar effect by which holes move from the source side junction region to the channel region having a lower potential (that is, higher potential as to electrons) which is different from the case where photoexcitation occurs in the drain side junction region as described with reference to FIG. 14. That is, it may be estimated that the first current component (this current component flows from the source region to the drain region) that is generated when electrons (see "e" in the drawing) generated by photoexcitation in the source side junction region move from the source side junction region to the source region having a lower potential is smaller than the second current component (this current component flows from the drain region to the source region) due to the bipolar effect.

In FIG. 15, the second current component due to the bipolar effect (that is, the current component due to the effect such that electrons that advances from the source region to the drain region because the base potential is reduced from a potential Lc1 to a potential Lc3 by positive electric charge of holes that have moved to the channel region) flows from the drain region to the source region. On the other hand, the above described first current component flows from the source region to the drain region. That is, the first current component and the second current component flow in the opposite directions. Here, referring back to FIG. 13, the drain current (see data E1) indicates a positive value when a light spot is irradiated from the source side junction region. That is, in this case, the drain current flows from the drain region to the source region. Thus, the first current component just suppresses the current component due to the bipolar effect, which is dark current or the second current component, and is not so large as to cause the drain current to flow from the source region to the drain region.

Moreover, because a difference in electric potential between the channel region and the source region is smaller than a difference in electric potential between the channel region and the drain region, a depleted region on the source region side (that is, the source side junction region) is narrower than a depleted region on the drain region side (that is, the drain side junction region). For this reason, when a light spot is irradiated to the source side junction region, the absolute magnitude of photoexcitation is small as compared with the case when a light spot is irradiated to the drain side junction region.

As described with reference to FIG. 14 and FIG. 15, when photoexcitation occurs in the drain side junction region, the first current component and the second current component both are generated to increase the drain current. On the other hand, when photoexcitation occurs in the source side junction region, the first current component suppresses the second current component. Thus, the drain current becomes larger (that is, light leakage current becomes large) when a light spot is irradiated to the drain side junction region than when a light spot is irradiated to the source side junction region.

Figure 16:
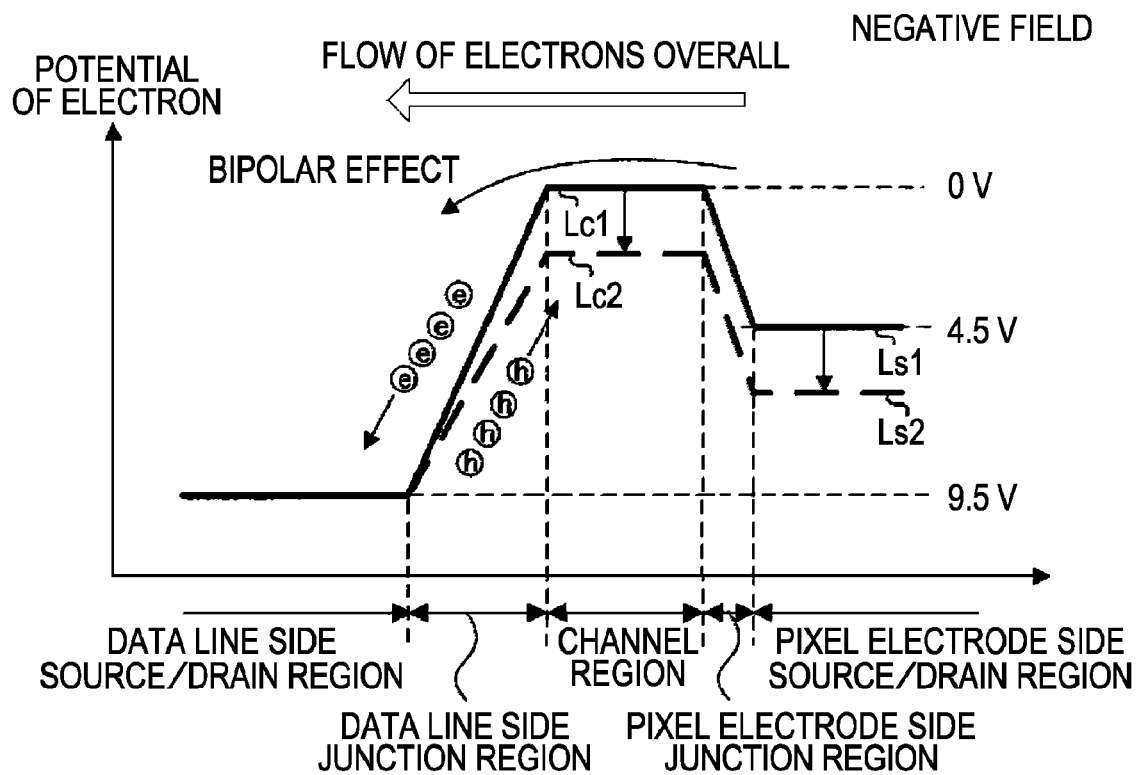
FIG. 16 is a conceptional diagram that shows the behavior of a carrier when photoexcitation occurs in a data line side junction region in the case where a data line side source/drain region is applied with a drain electric potential.
Figure 17:
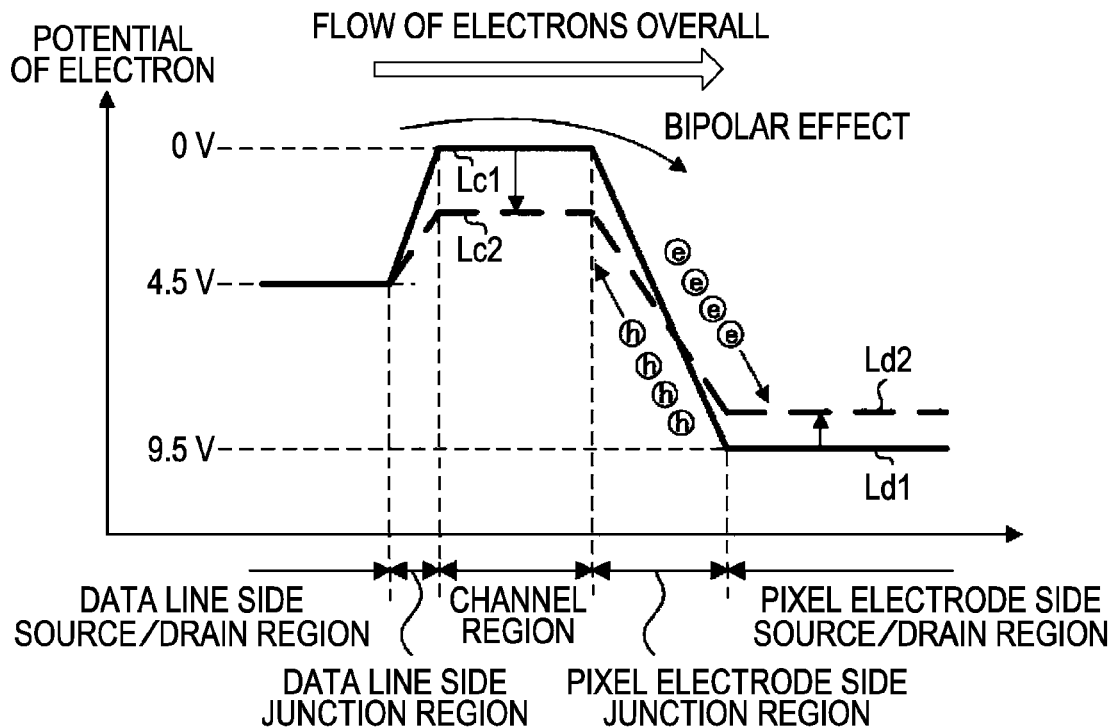
FIG. 17 is a conceptional diagram that shows the behavior of a carrier when photoexcitation occurs in a pixel electrode side junction region in the case where a pixel electrode side source/drain region is applied with a drain electric potential.

Next, mechanism in which light leakage current increases when the pixel electrode side source/drain region is applied with a drain electric potential and a light spot is irradiated to the pixel electrode side junction region than when the data line side source/drain region is applied with a drain electric potential and a light spot is irradiated to the data line side junction region will be described with reference to FIG. 16 and FIG. 17. Here, FIG. 16 is a conceptional diagram that shows the behavior of a carrier when photoexcitation occurs in the data line side junction region (that is, the drain side junction region) in the case where the data line side source/drain region is applied with a drain electric potential. FIG. 17 is a conceptional diagram that shows the behavior of a carrier when photoexcitation occurs in the pixel electrode side junction region (in other words, the drain side junction region) in the case where the pixel electrode side source/drain region is applied with a drain electric potential.

Hereinafter, the case where electric charge is held at a pixel portion that includes a pixel switching TFT and photoexcitation has occurred will be considered. This differs from the case where the above described TEG is assumed in that the pixel electrode side of the pixel switching TFT may be made into a floating state. A holding capacitor, such as the storage capacitor 70, may be connected to the pixel electrode side of the pixel switching TFT. When the capacitance of the holding capacitor is sufficiently large, the pixel electrode side is made into a state similar to a fixed electrode as in the case that uses the above described TEG. However, when the capacitance of the holding capacitor is not sufficiently large, the pixel electrode side is made into a floating state or a state closer to the floating state. Note that, here, it is assumed that the above capacitance is not sufficiently large.

In FIG. 16 and FIG. 17, alternating current drive is employed in the liquid crystal device in order to prevent a so-called burn-in. Here, by assuming display of a middle gray scale, it is assumed when the pixel electrode is alternately held with an electric charge of 4.5 V negative field and an electric charge of 9.5 V positive field using 7 V as a reference electric potential. Therefore, the source and drain of the pixel switching TFT are not fixed but exchanged between the pixel electrode side source/drain region and the data line side source/drain region. That is, as shown in FIG. 16, when the electric charge of negative field is held by the pixel electrode (that is, when the electric potential of the pixel electrode side source/drain region is lower than the electric potential of the data line side source/drain region), the pixel electrode side source/drain region becomes a source. In contrast, as shown in FIG. 17, when the electric charge of positive field is held by the pixel electrode (that is, when the electric potential of the pixel electrode side source/drain region is higher than the electric potential of the data line side source/drain region), the pixel electrode side source/drain region becomes a drain.

In FIG. 16, when the electric charge of negative field is held by the pixel electrode, the pixel electrode side source/drain region becomes a source (or an emitter) and the data line side source/drain region becomes a drain (or a collector). When photoexcitation occurs in the data line side junction region, which is the drain side junction region, as described above, the first current component based on movement of electrons generated by the photoexcitation and the second current component due to the bipolar effect are generated. Here, when the second current component is generated on the basis of the bipolar effect (that is, the base potential is reduced from the potential Lc1 to the potential Lc2, and electrons move from the pixel electrode side source/drain region, which serves as a source, to the data line side source/drain region, which serves as a drain), electrons are taken out from the pixel electrode side source/drain region, which is in a floating state. Thus, the potential of the pixel electrode side source/drain region, which serves as an emitter, is reduced from the potential Ls1 to the potential Ls2 (the electric potential increases). That is, when photoexcitation occurs in the data line side junction region, which is the drain side junction region, the base potential decreases and the potential of the pixel electrode side source/drain region, which serves as an emitter, decreases. In other words, when photoexcitation occurs in the data line side junction region, which is the drain side junction region, the emitter electric potential increases as the base electric potential increases. For this reason, the drain current (that is, collector current) is suppressed.

On the other hand, in FIG. 17, when the electric charge of positive field is held by the pixel electrode, the data line side source/drain region becomes a source (or an emitter), and the pixel electrode side source/drain region becomes a drain (or a collector). When photoexcitation occurs in the pixel electrode side junction region, which is the drain side junction region, as described above, the first current component based on movement of electrons generated by the photoexcitation and the second current component due to the bipolar effect are generated. Here, because the data line side source/drain region, which serves as a source, is connected to the data line, the data line side source/drain region is not made into a floating state, unlike the pixel electrode, and the electric potential thereof does not change. Here, when the second current component is generated on the basis of the bipolar effect (that is, the base potential is reduced from the potential Lc1 to the potential Lc2, and electrons move from the data line side source/drain region, which serves as a source, to the pixel electrode side source/drain region, which serves as a drain), electrons flow to the pixel electrode side source/drain region, which is in a floating state. Thus, the potential of the pixel electrode side source/drain region, which serves as a collector, is increased from the potential Ld1 to the potential Ld2 (the electric potential decreases). However, the increase in potential of the pixel electrode side source/drain region, which serves as a collector, unlike the decrease in potential of the pixel electrode side source/drain region, which serves as a source as described above, hardly functions to suppress the drain current. The drain current (that is, collector current) is determined mainly on the basis of the magnitude of base electric potential relative to the emitter electric potential, so that a decrease in collector electric potential hardly suppresses the drain current, that is, the bipolar transistor enters a saturation region.

As described with reference to FIG. 16 and FIG. 17, when the electric charge of positive field is held by the pixel electrode (that is, when the pixel electrode side source/drain region becomes a drain), the second current component due to the bipolar effect is hardly suppressed; in contrast, when the electric charge of negative field is held by the pixel electrode (that is, when the data line side source/drain region becomes a drain), the second current component due to the bipolar effect is suppressed because of the increase in electric potential of the pixel electrode side source/drain region, which is in a floating state. That is, the drain current increases on the basis of light leakage current when the pixel electrode side source/drain region becomes a drain than when the data line side source/drain region becomes a drain.

Figure 18:
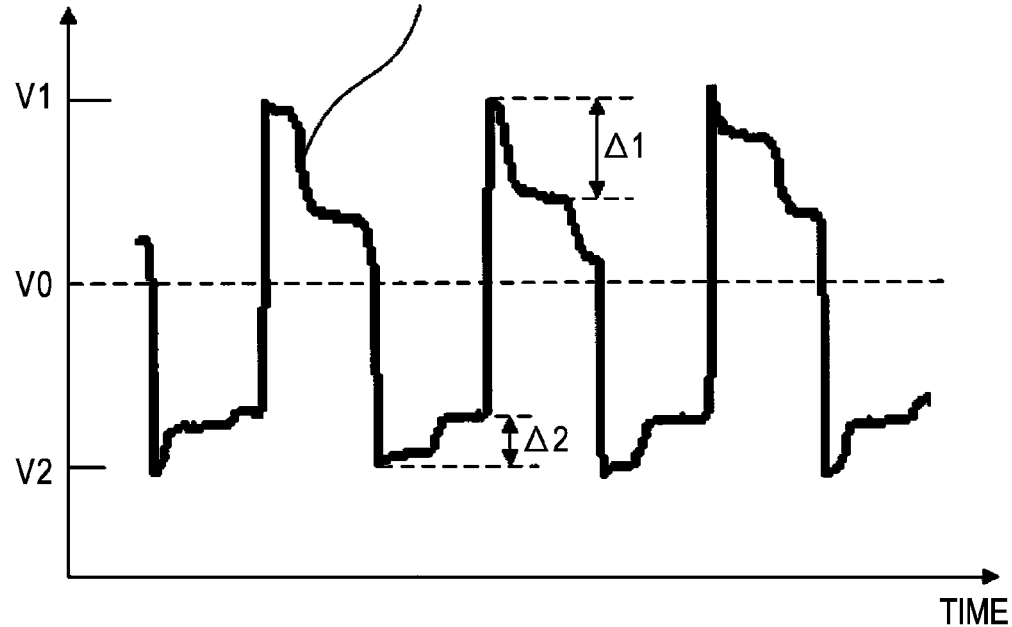
FIG. 18 is a view that shows a waveform of a pixel electrode electric potential when relatively intensive light is irradiated to the overall pixel switching TFT.

Here, FIG. 18 is a view that shows a waveform of a pixel electrode electric potential when relatively intensive light is irradiated to the overall pixel switching TFT.

In FIG. 18, data E2 indicate that the variation Δ1 in pixel electrode electric potential when the electric charge of positive field is held by the pixel electrode (when the pixel electrode electric potential is an electric potential V1) is larger than the variation Δ2 in pixel electrode electric potential when the electric charge of negative field is held by the pixel electrode (when the pixel electrode electric potential is an electric potential V2). That is, the data E2 indicate that the electric charge of positive field is held poorer in the pixel electrode than the electric charge of negative field (that is, light leakage is likely to occur). This coincides with the above described mechanism in which light leakage current tends to occur when the electric charge of positive field is held by the pixel electrode (that is, when the pixel electrode side source/drain region becomes a drain) than when the electric charge of negative field is held by the pixel electrode (that is, when the data line side source/drain region becomes a drain).

As described above in detail with reference to FIG. 13 to FIG. 18, the drain current is likely to increase when photoexcitation occurs in the drain side junction region of the pixel switching TFT. Furthermore, the drain current is likely to increase when the pixel electrode side source/drain region becomes a drain (conversely, when the data line side source/drain region becomes a drain, the current component due to the bipolar effect is suppressed). Thus, as in the case of the liquid crystal device according to the present embodiment, by enhancing a light shielding property to the pixel electrode side LDD region 1c, which is the pixel electrode side junction region, higher than a light shielding property to the data line side LDD region 1b, which is the data line side junction region, it is possible to highly effectively reduce light leakage current in the TFT 30 while maintaining a high aperture ratio.

Second Embodiment

A liquid crystal device according to a second embodiment of the invention will be described with reference to FIG. 19 and FIG. 20. The liquid crystal device according to the second embodiment differs from the above described liquid crystal device according to the first embodiment in that the second elongated portion has a different configuration in the gate electrode of the TFT in each pixel. Thus, only the portions different from the liquid crystal device according to the first embodiment will be described with reference to FIG. 19 and FIG. 20. The same configuration as that of the liquid crystal device according to the first embodiment will be described with reference to FIG. 1 to FIG. 18 and an overlapping description may be omitted.

Figure 19:
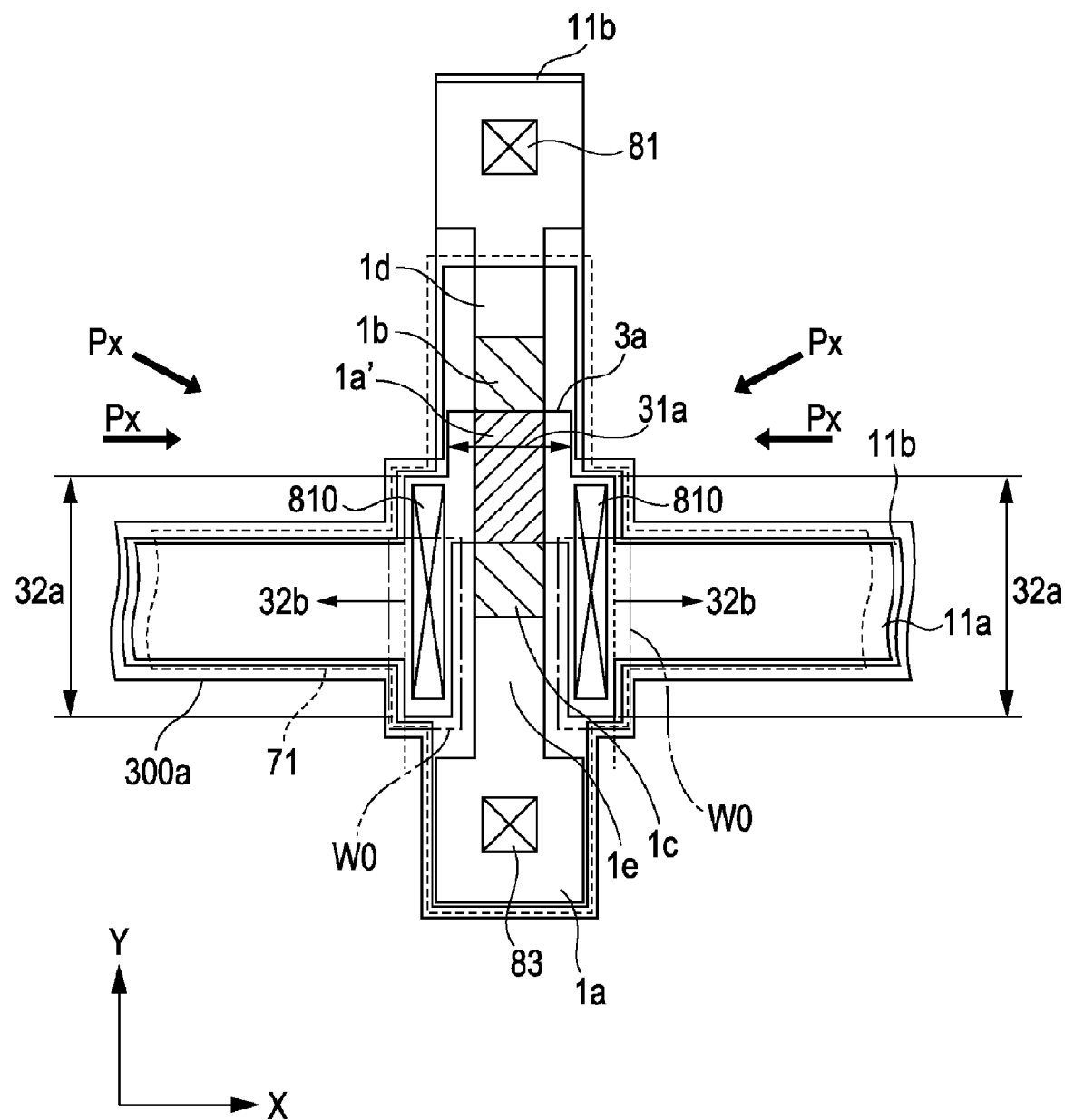
FIG. 19 is a plan view that shows a configuration of a transistor, focusing on the arrangement of a gate electrode to the transistor according to a second embodiment.
Figure 20:
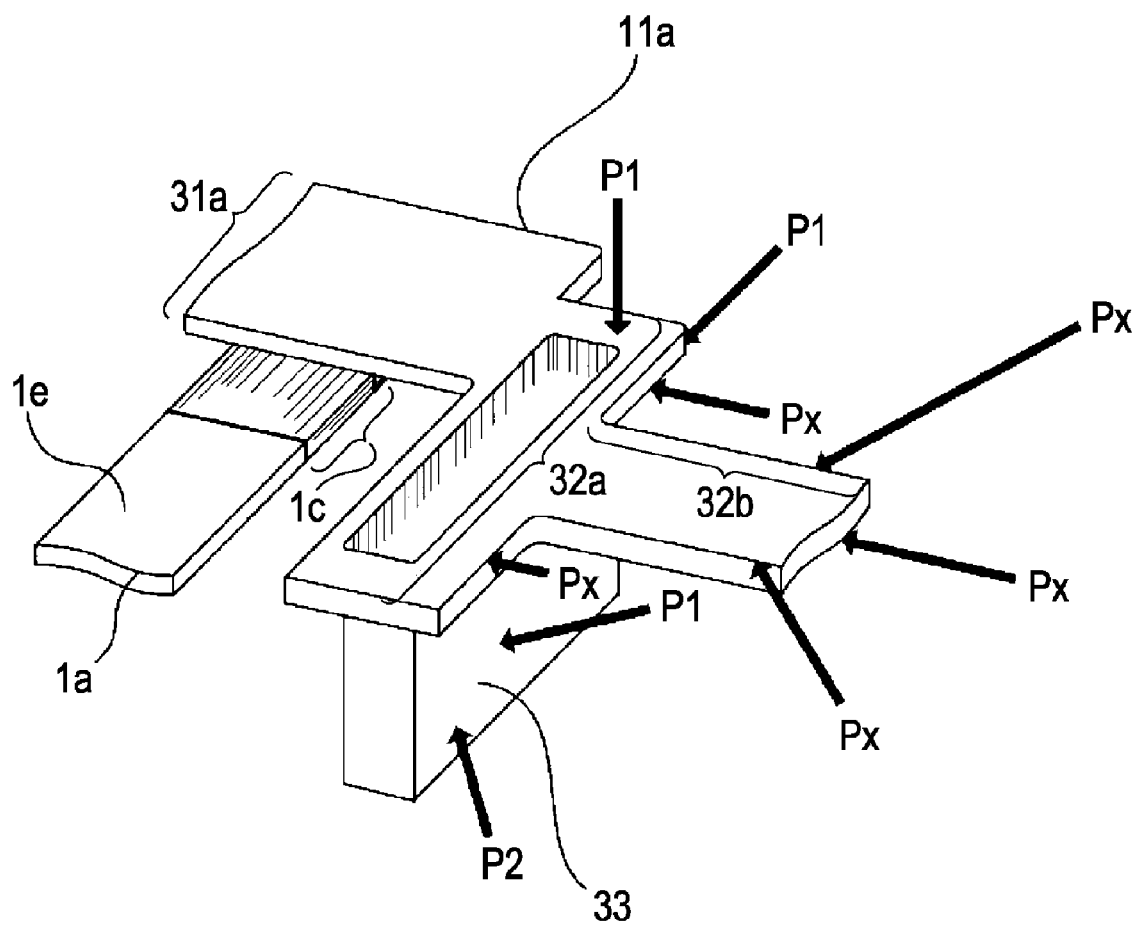
FIG. 20 is a view that illustrates a function of the gate electrode according to the second embodiment.

FIG. 19 is a plan view that shows a configuration of a transistor, focusing on the arrangement of a gate electrode to the transistor according to the second embodiment. FIG. 20 is a view that illustrates a function of the gate electrode according to the second embodiment.

In FIG. 19, in an upper layer to the semiconductor layer 1a in the pixel, the second elongated portions 32b of the gate electrode 3a extend from portions of the first elongated portions 32a, which are arranged at least in the adjoining regions W0 and adjoin the pixel electrode side LDD region 1c.

Thus, at portions of the first elongated portions 32a, arranged in the adjoining regions W0, an area of arrangement of the portions that at least adjoin the pixel electrode side LDD region 1c may be apparently increased on the TFT array substrate 10 by an amount of the second elongated portions 32b. Thus, in FIG. 19 or in FIG. 20, light that enters from the side face of the pixel electrode side LDD region 1c to at least the pixel electrode side LDD region 1c in the semiconductor layer 1a, for example, light that travels along the arrow Px in the drawing, may be blocked with a wider area by an amount of the second elongated portions 32b. Note that, in FIG. 19 and FIG. 20, one example of a traveling direction of light that has a component along the X direction shown in FIG. 19 is indicated by the arrow Px.

Accordingly, a light shielding property to light that will enter at least the pixel electrode side LDD region 1c in the semiconductor layer 1a from the side face of the pixel electrode side LDD region 1c is enhanced by adding the second elongated portion 32b to the first elongated portion 32a, so that it is possible to further effectively improve a light shielding property.

Electronic Apparatus

Figure 21:
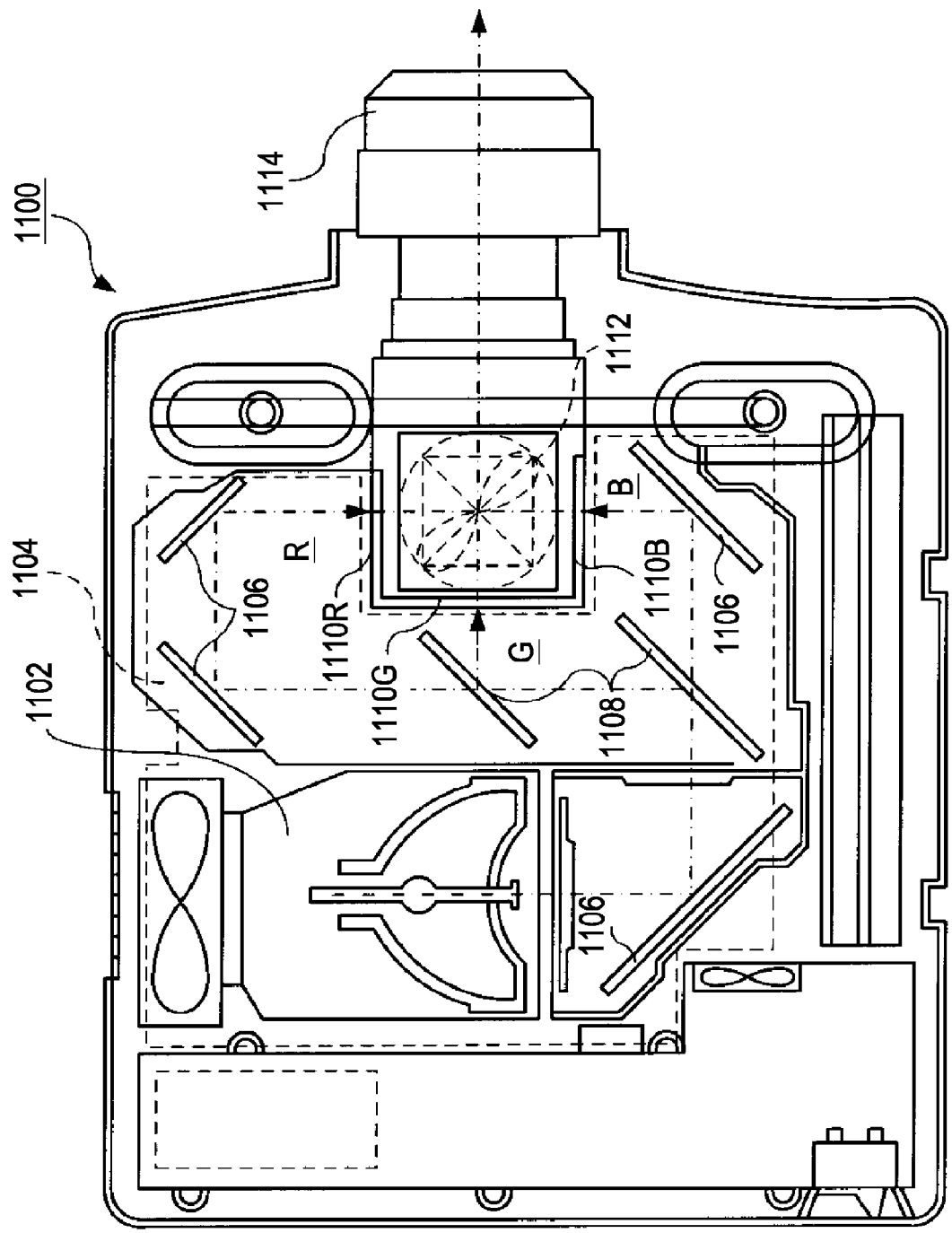
FIG. 21 is a plan view that shows a configuration of a projector, which is one example of an electronic apparatus to which the electro-optical device is applied.

Next, the case where the liquid crystal device, which is the above described electro-optical device, is applied to various electronic apparatuses will be described. Here, FIG. 21 is a plan view that shows a configuration example of a projector. Hereinafter, a projector that uses the liquid crystal device as a light valve will be described.

As shown in FIG. 21, a projector 1100 installs therein a lamp unit 1102 formed of a white light source, such as a halogen lamp. Light projected from the lamp unit 1102 is split into three primary colors, that is, RGB, by four mirrors 1106 and two dichroic mirrors 1108, which are arranged in a light guide 1104 and then enter liquid crystal panels 1110R, 1110B and 1110G, which are light valves corresponding to the primary colors.

The configurations of the liquid crystal panels 1110R, 1110B and 1110G are equivalent to the above described liquid crystal device, and are respectively driven by primary color signals of R, G, B, which are supplied from an image signal processing circuit. Then, light modulated by these liquid crystal panels enters a dichroic prism 1112 from the three directions. In this dichroic prism 1112, R light and B light are refracted at a right angle while, on the other hand, G light goes straight. Thus, by composing images corresponding to the respective colors, a color image is projected onto a screen, or the like, through a projection lens 1114.

Here, focusing on display images by the liquid crystal panels 1110R, 1110B and 1110G, the display image by the liquid crystal panel 1110G needs to be mirror reversed relative to the display images of the liquid crystal panels 1110R, 1110B.

Note that, because rays of light corresponding to the primary colors of R, G, B enter the liquid crystal panels 1110R, 1110B and 1110G by the dichroic mirrors 1108, no color filter needs to be provided.

Note that, in addition to the electronic apparatus described with reference to FIG. 21, the electronic apparatus may include a mobile personal computer, a cellular phone, a liquid crystal television, a viewfinder type or a direct view type video tape recorder, a car navigation system, a pager, a personal organizer, an electronic calculator, a word processor, a workstation, a video telephone, a point-of-sales terminal, and devices provided with a touch panel. Then, of course, the aspects of the invention may be applied to the above various electronic apparatuses.

In addition, the aspects of the invention may be applied to a reflective liquid crystal device (LCOS), a plasma display (PDP), a field emission display (FED, SED), an organic EL display, a digital micromirror device (DMD), an electrophoretic device, or the like, in addition to the liquid crystal device described in the above embodiments.

The invention is not limited to the above described embodiments, and may be modified into various forms without departing from the spirit and scope of the invention as described in the appended claims and specification. The scope of the invention also encompasses the thus modified electro-optical device substrate, an electro-optical device that is provided with the electro-optical device substrate, and an electronic apparatus provided with the electro-optical device.

What is claimed is:

1. An electro-optical device substrate comprising:
   a substrate;
   a plurality of data lines;
   a plurality of scanning lines intersecting the plurality of data lines in a display area formed on the substrate;
   pixel electrodes that are provided at positions corresponding to intersections of the plurality of data lines and the plurality of scanning lines; and
   transistors, each including;
      a semiconductor layer including:
         a channel region with a channel length along a first direction in the display area;
         a data line side source/drain region electrically connected to a corresponding one of the data lines;
         a pixel electrode side source/drain region electrically connected to a corresponding one of the pixel electrodes,
         a first junction region located between the channel region and the data line side source/drain region; and
         a second junction region formed between the channel region and the pixel electrode side source/drain region; and
      a gate electrode including;
         a body portion that is arranged in layer above the semiconductor layer through a first insulating film and that overlaps the channel region as viewed in plan;
         a first elongated portion extending from the body portion by a side of the semiconductor layer along the first direction to a side of the second junction region so as to adjoin at least the second junction region;
         a second elongated portion extending from at least a portion of the first elongated portion along a second direction that intersects with the first direction, and electrically connected to a corresponding one of the scanning lines; and
         a longitudinal groove formed in the first insulating film at a portion that overlaps the first elongated portion on the substrate as viewed in plan so as to extend along the second junction region,
      the first elongated portion having an inner groove portion that is at least partly formed inside the groove.

2. The electro-optical device substrate according to claim 1, wherein the first elongated portion and the second elongated portion each are provided on both sides of the semiconductor layer.

3. The electro-optical device substrate according to claim 1, wherein the second elongated portion extends from at least a portion of the first elongated portion, which adjoins the second junction region.

4. The electro-optical device substrate according to claim 1, wherein the first elongated portion is provided so as to at least partly adjoin the pixel electrode side source/drain region.

5. The electro-optical device substrate according to claim 4, wherein the second elongated portion extends from a portion of the first elongated portion, which adjoins at least the pixel electrode side source/drain region.

6. The electro-optical device substrate according to claim 4, wherein the groove is formed along at least a portion of the pixel electrode side source/drain region.

7. The electro-optical device substrate according to claim 1, wherein the first elongated portion is provided so as to at least partly adjoin the channel region.

8. The electro-optical device substrate according to claim 7, wherein the groove is formed along at least a portion of the channel region.

9. The electro-optical device substrate according to claim 1, wherein the scanning lines and the gate electrodes are formed with the same film each other.

10. The electro-optical device substrate according to claim 1, wherein the first junction region and the second junction region both are LDD regions.

11. The electro-optical device substrate according to claim 1, further comprising:
   a second insulating film that is arranged in a lower layer than the semiconductor layer on the substrate, wherein
   the groove may extend through the first insulating film so as to be also formed in the second insulating film.

12. The electro-optical device substrate according to claim 11, further comprising:
   a lower side light shielding film that contains a light shielding material, wherein the lower side light shielding film is arranged in a lower layer than the second insulating film on the substrate and at least partly overlaps the semiconductor layer, wherein the groove is formed to also extend through the second insulating film to a surface of the lower side light shielding film, and wherein the inner groove portion and the lower side light shielding film are electrically connected to each other in the groove.

13. An electro-optical device comprising the electro-optical device substrate according to claim 1.

14. An electronic apparatus comprising the electro-optical device according to claim 13.

* * * * *